(12) United States Patent
Ohwe

(10) Patent No.: US 6,388,840 B1
(45) Date of Patent: May 14, 2002

(54) SUSPENSION HAVING A HEAD IC MOUNTING PORTION FORMED ON A RIGID PORTION BETWEEN A BASE PORTION AND A HEAD SLIDER MOUNTING PORTION

(75) Inventor: Takeshi Ohwe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/643,536

(22) Filed: Aug. 22, 2000

Related U.S. Application Data

(62) Division of application No. 09/046,827, filed on Mar. 24, 1998, now Pat. No. 6,134,084.

(30) Foreign Application Priority Data

Sep. 10, 1997 (JP) .............................................. 9-245495
Jan. 8, 1998 (JP) ............................................ 10-002593

(51) Int. Cl.⁷ ................................................. G11B 5/48
(52) U.S. Cl. .................................................. 360/244.1
(58) Field of Search ..................................... 360/244.1

(56) References Cited

U.S. PATENT DOCUMENTS

| 5,014,145 A | 5/1991 | Hosokawa et al. ......... 360/104 |
| 5,528,819 A | 6/1996 | McKay et al. ........... 29/603.07 |
| 5,555,619 A | 9/1996 | Maggio et al. ................ 29/860 |
| 5,608,591 A | 3/1997 | Klaasen ....................... 360/104 |
| 5,864,446 A | 1/1999 | Endo et al. .................. 360/104 |
| 6,014,289 A | * 1/2000 | Goss ........................ 360/244.1 |
| 6,084,746 A | * 7/2000 | Shiraishi ................... 360/244.1 |

FOREIGN PATENT DOCUMENTS

| GB | 2256740 | 12/1992 |
| JP | 325717 | 2/1991 |
| JP | 3108120 | 5/1991 |
| JP | 3272015 | 12/1991 |
| JP | 5143949 | 6/1993 |
| JP | 5282642 | 10/1993 |
| JP | 9128728 | 5/1997 |

\* cited by examiner

*Primary Examiner*—A. J. Heinz
(74) *Attorney, Agent, or Firm*—Greer, Burns & Crain, Ltd.

(57) ABSTRACT

A wiring pattern having a small inductance and a small capacitance can be formed without increasing an equivalent mass of a suspension supporting a head slider in a disc apparatus. The suspension elastically supports the head slider having a head. A base portion of the suspension is mounted to an arm driven by an actuator. The head slider is mounted on a head slider mounting portion formed on an end of the suspension opposite to the base portion. A tongue portion is formed along a side of the base portion. The tongue portion uprightly protrudes from the base portion. A head IC chip is mounted on a head IC chip mounting portion formed in the tongue portion.

9 Claims, 16 Drawing Sheets

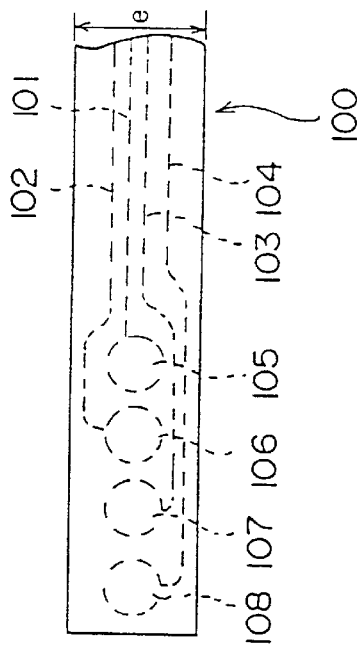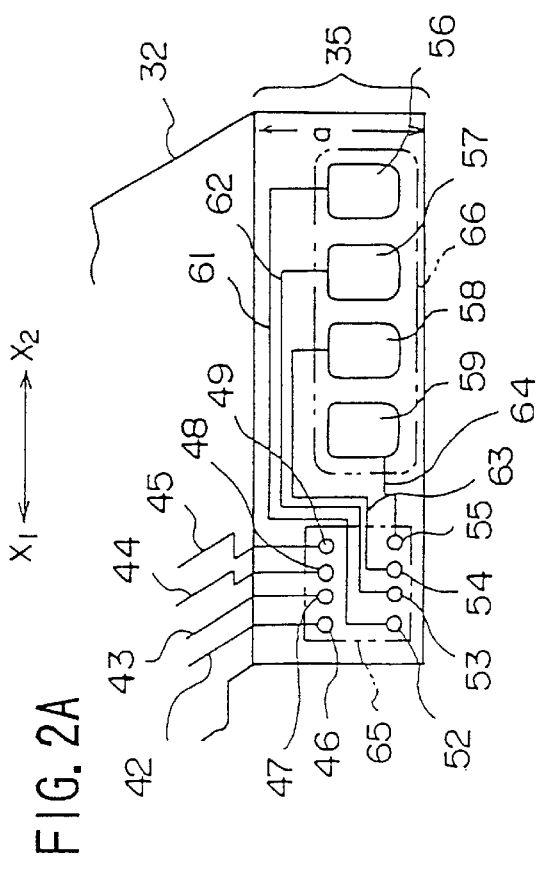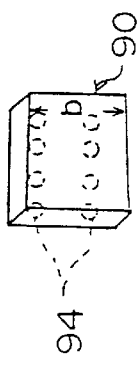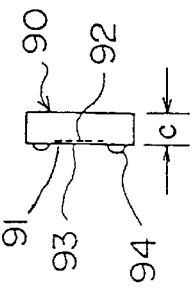
FIG. 2B
FIG. 2A
FIG. 2C
FIG. 2D

SUSPENSION HAVING A HEAD IC MOUNTING PORTION FORMED ON A RIGID PORTION BETWEEN A BASE PORTION AND A HEAD SLIDER MOUNTING PORTION

This is a divisional of application Ser. No. 09/046,827, filed Mar. 24, 1998, issued on Oct. 17, 2001 as U.S. Pat. No. 6,134,084.

BACKGROUND OF THE INVENTION

1. Field of the Invention

The present invention relates to a disc apparatus and, more particularly to a magnetic head slider supporting device which includes a suspension to support a magnetic head.

As frequencies of signals used by information processing apparatuses increased, it is required for a magnetic disc apparatus to increase a signal writing frequency, which is presently 70 MHz, up to 200 to 300 MHz. In order to increase the signal writing frequency, an inductance and a capacitance of a signal transmission path from a magnetic head slider to a head IC must be reduced. On the other hand, since a reduction in thickness of the magnetic disc apparatus is required, the head IC must be mounted at a position where the head IC does not contact a magnetic disc when a shock is applied to the magnetic disc apparatus. Additionally, in order to increase reliability of the magnetic disc apparatus, it is preferred to mount the head IC at a position where an equivalent mass of a magnetic head slider supporting device is not increased.

2. Description of the Related Art

Conventionally, Japanese Laid-Open Patent Applications No. 5-143949, 3-272015, No. 3-108120 and No. 3-25717 disclose magnetic disc apparatuses having a head IC mounted on an arm, the head IC being used for amplifying a read signal supplied from a head.

In the above-mentioned magnetic disc apparatuses, a distance between the head and the head IC is long. Thus, it is difficult to reduce an inductance and capacitance of a transmission path from the head to the head IC. Additionally, since the head IC is packaged by a synthetic resin and has a relatively large thickness, a large space must be provided between adjacent magnetic discs so that the head IC does not contact the magnetic discs when a shock is applied to the magnetic disc apparatus. Accordingly, thickness of the magnetic disc apparatus is increased. Further, since the head IC is packaged by a synthetic resin and has a relatively large weight, an equivalent mass of the magnetic head slider supporting device is increased. Thus, floating stability of a magnetic head slider with respect to a magnetic disc is decreased. Additionally, the magnetic disc may be damaged due to an increased shock when the magnetic head slider contacts the magnetic disc in a case in which a large shock is applied to the magnetic disc apparatus.

SUMMARY OF THE INVENTION

It is a general object of the present invention to provide an improved and useful head slider supporting device including a suspension in which the above-mentioned problems are eliminated.

A more specific object of the present invention is to provide a suspension on which a wiring pattern having a small inductance and a small capacitance can be formed without increasing an equivalent mass of the suspension.

Another object of the present invention is to provide a suspension to which a head IC chip can be mounted in a state where the mounted head IC chip is prevented from contacting surrounding parts.

In order to achieve the above-mentioned objects, there is provided according to one aspect of the present invention a suspension elastically supporting a head slider having a head, comprising:

a base portion adapted to be mounted to an arm driven by an actuator;

a head slider mounting portion adapted to support the head slider, the head slider mounting portion being formed on an end of the suspension opposite to the base portion;

a tongue portion formed along a side of the base portion, the tongue portion uprightly protruding from the base portion; and a head IC chip mounting portion formed in the tongue portion, the head IC chip mounting portion adapted to support a head IC chip connected to the head.

According to the above-mentioned invention, the head IC chip is mounted on the tongue portion which protrudes uprightly from the base portion mounted to the arm. That is, the head IC chip is mounted to a position which does not influence an equivalent mass of the suspension. Thus, the suspension according to the present invention provides good floating stability to the head slider. Additionally, when a shock is applied to the disc apparatus using the suspension according to the present invention, the strength of the shock is not increased by the suspension which has a reduced mass as compared to the conventional suspension. Further, since the head IC chip is mounted to a side of the base portion, the head IC does not protrude from a surface of the suspension. Thus, the head IC chip does not contact a disc even when a strong shock is applied to the suspension.

The suspension according to the present invention may further comprises a wiring pattern extending from the head slider mounting portion to the tongue portion so as to electrically connect the head to the head IC chip.

Accordingly, a length of the wiring pattern can be minimized, and an inductance and a capacitance provided by the wiring pattern can be minimized. Thus, a frequency of a signal transmitted through the wiring pattern can be increased beyond 70 MHz and up to 200 to 300 MHz.

In one embodiment according to the present invention, the head may be a magnetic head. Additionally, the base portion may be made of a metal plate, and the tongue portion may be formed by bending the metal plate.

Additionally, there is provided according to another aspect of the present invention a suspension elastically supporting a head slider having a head, comprising:

a base portion adapted to be mounted to an arm driven by an actuator;

a head slider mounting portion adapted to support the head slider, the head slider mounting portion being formed on an end of the suspension opposite to the base portion;

a rigid portion located between the base portion and the head slider mounting portion, the rigid portion having a rib along each side of the rigid portion;

a wiring pattern extending from the head slider mounting portion to the base portion through the rigid portion, the wiring pattern being provided on a surface from which the rib is extended; and a head IC chip mounting portion formed on the surface of the rigid portion from which the rib is extended, the head IC chip mounting portion adapted to support a head IC chip connected to the head.

According to this invention, since the head IC chip is mounted on the rigid portion, the head IC chip does not increase an equivalent mass of the suspension. Additionally, the head IC chip is connected to a middle portion of the wiring pattern extending from the head slider to the base portion of the suspension, and a length of the wiring pattern is not increased. Additionally, a length of the wiring pattern can be minimized, and an inductance and a capacitance provided by the wiring pattern can be minimized. Thus, a frequency of a signal transmitted through the wiring pattern can be increased beyond 70 MHz and up to 200 to 300 MHz.

In one embodiment according to the present invention, the rigid portion may be made of a metal plate, and each rib of the rigid portion may be formed by bending the metal plate.

Additionally, there is provided according to another aspect of the present invention a head slider supporting device comprising:

A) a suspension comprising:
   a base portion adapted to be mounted to an arm driven by an actuator;
   a head slider mounting portion formed on an end of the suspension opposite to the base portion;
   a tongue portion formed along a side of the base portion, the tongue portion uprightly protruding from the base portion; and
   a head IC chip mounting portion formed in the tongue portion;

B) a head slider mounted on the head slider mounting portion of the suspension, the head slider including a head; and C) a head IC mounted on the head IC chip mounting portion of the tongue portion of the suspension so that the head IC is electrically connected to the head of the head slider.

According to the above-mentioned invention, the head IC chip is mounted on the tongue portion which uprightly protrudes from the base portion mounted to the arm. That is, the head IC chip is mounted to a position which does not influence an equivalent mass of the suspension. Thus, the head slider supporting device according to the present invention provides good floating stability to the head slider. Additionally, when a shock is applied to the disc apparatus using the head slider supporting device according to the present invention, the strength of the shock is not increased by the suspension which has a reduced mass as compared to the conventional suspension. Further, since the head IC chip is mounted to a side of the base portion, the head IC does not protrude from a surface of the suspension. Thus, the head IC chip does not contact a disc even when a strong shock is applied to the head slider supporting device.

Additionally, there is provided according to another aspect of the present invention a head slider supporting device comprising:

A) a suspension comprising:
   a base portion;
   a head slider mounting portion formed on an end of the suspension opposite to the base portion;
   a tongue portion formed along a side of the base portion, the tongue portion uprightly protruding from the base portion; and
   a head IC chip mounting portion formed in the tongue portion;

B) an interconnecting member having a first end and a second end opposite to the first end, the first end adapted to be connected to an arm driven by an actuator, the second end connected to the base portion of the suspension;

C) a head slider mounted on the head slider mounting portion of the suspension, the head slider including a head; and D) a head IC mounted on the head IC chip mounting portion of the tongue portion of the suspension so that the head IC is electrically connected to the head of the head slider.

According to the above-mentioned invention, the head IC chip is mounted on the tongue portion which uprightly protrudes from the base portion mounted to the arm. That is, the head IC chip is mounted at a position which does not influence an equivalent mass of the suspension. Thus, the head slider supporting device according to the present invention provides good floating stability to the head slider. Additional, when a shock is applied to the disc apparatus using the head slider supporting device according to the present invention, the strength of the shock is not increased by the suspension which has a reduced mass as compared to the conventional suspension. Further, since the head IC chip is mounted to a side of the base portion, the head IC does not protrude from a surface of the suspension. Thus, the head IC chip does not contact a disc even when a strong shock is applied to the head slider supporting device. Additionally, since the interconnecting member is provided between the suspension and the arm, the head slider supporting device can be easily mounted.

Additionally, there is provided according to another aspect of the present invention a head slider supporting device comprising:

A) a suspension comprising:
   a base portion adapted to be mounted to an arm driven by an actuator;
   a head slider mounting portion formed on an end of the suspension opposite to the base portion;
   a rigid portion located between the base portion and the head slider mounting portion, the rigid portion having a rib along each side of the rigid portion;
   a wiring pattern extending from the head slider mounting portion to the base portion through the rigid portion, the wiring pattern being provided on a surface from which the rib is extended; and
   a head IC chip mounting portion formed in the rigid portion;

B) a head slider mounted on the head slider mounting portion of the suspension, the head slider including a head; and C) a head IC mounted on the head IC chip mounting portion of the rigid portion of the suspension so that the head IC is electrically connected to the head of the head slider.

According to this invention, since the head IC chip is mounted on the rigid portion, the head IC chip does not increase an equivalent mass of the suspension. Thus, the head slider supporting device can provide provides good floating stability to the head slider. Additionally, since the head IC chip is connected to a middle portion of the wiring pattern extending from the head slider to the base portion of the suspension, a length of the wiring pattern is not increased. Thus, an inductance and a capacitance of the wiring pattern can be minimized. Further, a length of the wiring pattern can be minimized, and thus an inductance and a capacitance due to the wiring pattern can be minimized. Thus, a frequency of a signal transmitted through the wiring pattern can be increased beyond 70 MHz and up to 200 to 300 MHz.

Additionally, there is provided according to another aspect of the present invention a disc apparatus comprising:
A) a rotating disk;
B) an actuator;
C) an arm driven by the actuator; and
D) a head slider supporting device comprising:
D-1) a suspension comprising:
a base portion;
a head slider mounting portion formed on an end of the suspension opposite to the base portion;
a tongue portion formed along a side of the base portion, the tongue portion uprightly protruding from the base portion; and
a head IC chip mounting portion formed in the tongue portion;
D-2) an interconnecting member having a first end and a second end opposite to the first end, the first end connected to the arm, the second end connected to the base portion of the suspension;
D-3) a head slider mounted on the head slider mounting portion of the suspension, the head slider including a head; and
D-4) a head IC mounted on the head IC chip mounting portion of the tongue portion of the suspension so that the head IC is electrically connected to the head of the head slider.

According to the above-mentioned invention, the head IC chip is mounted on the tongue portion which uprightly protrudes from the base portion mounted to the arm. That is, the head IC chip is mounted at a position which does not influence an equivalent mass of the suspension. Thus, the disc apparatus according to the present invention provides good floating stability to the head slider. Additionally, when a shock is applied to the disc apparatus according to the present invention, the strength of the shock is not increased by the suspension which has a reduced mass as compared to the conventional suspension. Further, since the head IC chip is mounted to a side of the base portion, the head IC does not protrude from a surface of the suspension. Thus, the head IC chip does not contact a disc even when a strong shock is applied to the disc apparatus.

Additionally, there is provided according to another aspect of the present invention a disc apparatus comprising:
A) a rotating disk;
B) an actuator;
C) an arm driven by the actuator; and
D) a head slider supporting device comprises:
D-1) a suspension comprising:
a base portion mounted to the arm;
a head slider mounting portion formed on an end of the suspension opposite to the base portion;
a rigid portion located between the base portion and the head slider mounting portion, the rigid portion having a rib along each side of the rigid portion;
a wiring pattern extending from the head slider mounting portion to the base portion through the rigid portion, the wiring pattern being provided on a surface from which the rib is extended; and
a head IC chip mounting portion formed in the rigid portion;
D-2) a head slider mounted on the head slider mounting portion of the suspension, the head slider including a head; and
D-3) a head IC mounted on the head IC chip mounting portion of the rigid portion of the suspension so that the head IC is electrically connected to the head of the head slider.

According to this invention, since the head IC chip is mounted on the rigid portion, the head IC chip does not increase an equivalent mass of the suspension. Thus, the disc apparatus can provide good floating stability to the head slider. Additionally, since the head IC chip is connected to a middle portion of the wiring pattern extending from the head slider to the base portion of the suspension, a length of the wiring pattern is not increased. Thus, an inductance and a capacitance of the wiring pattern can be minimized. Additionally, since a length of the wiring pattern can be minimized, an inductance and a capacitance due to the wiring pattern can be minimized. Thus, a frequency of a signal transmitted through the wiring pattern can be increased beyond 70 MHz and up to 200 to 300 MHz.

Additionally, there is provided according to another aspect of the present invention a method for manufacturing a head slider supporting device including a suspension having an end on which a head slider including a head is mounted, a head IC chip being mounted on the suspension so that the head IC chip is electrically connected to the head, the method comprising the steps of:
mounting the head IC chip to the suspension; and
mounting the head slider to the suspension on which the head IC chip is mounted.

According to the above-mentioned invention, since the head IC chip is mounted to the suspension before the head slider is mounted to the suspension, the head provided in the head slider can be prevented from being statically destroyed during a manufacturing process of the head slider supporting device.

Additionally, there is provided according to the present invention a method for manufacturing a head slider supporting device including a suspension having an end on which a head slider including a head is mounted, a head IC chip being mounted on the suspension so that the head IC chip is electrically connected to the head, the method comprising the steps of:
mounting a dummy circuit chip having a short circuit to a predetermined portion of the suspension on which the head IC ship is to be mounted;
mounting the head slider to the suspension on which the dummy circuit chip is mounted;
removing the dummy circuit chip from the suspension; and
mounting the head IC chip to the suspension.

According to the above-mentioned invention, since the dummy circuit chip is mounted to the suspension before the head slider is mounted to the suspension, the head provided in the head slider can be prevented from being statically destroyed during a manufacturing process of the head slider supporting device.

Additionally, there is provided according to another aspect of the present invention a suspension elastically supporting a head slider having a head, the suspension being connected to an interconnecting member connected to an arm driven by an actuator, the suspension comprising:
a mount portion adapted to be mounted to the interconnecting member;
a head slider mounting portion adapted to support the head slider, the head slider mounting portion being formed on an end of the suspension opposite to the mount portion;
a first tongue portion formed along one side of the mount portion, the first tongue portion protruding from the mount portion in a direction perpendicular to a surface of the mount portion;

a second tongue portion formed along another side of the mount portion, the second tongue portion protruding from the mount portion in the same direction as the first tongue portion;

a first wiring pattern extending from the head slider mounting portion to the first tongue portion;

a second wiring pattern extending from the first tongue portion to the second tongue portion by traversing the mount portion;

a head IC chip mounting portion formed in the first tongue portion, the head IC chip mounting portion adapted to support a head IC chip connected to the head; and a connecting portion formed in the second tongue portion, the connecting portion adapted to be electrically connected to an external device.

According to the above-mentioned invention, since the first tongue portion and the second tongue portion are positioned on opposite sides of the mount portion, an operation for connecting a wire to the connecting portion and an operation for mounting the head IC chip to the head IC chip mounting portion can be performed with good operability.

In the above-mentioned suspension, the first tongue portion and the second tongue portion may be offset from each other in a longitudinal direction of the suspension.

Accordingly, when two of the suspensions are arranged in a back-to-back relationship, the first tongue portion and the second tongue portion do not interfere with each other. Additionally, an assembling jig can be easily accessed to the first and second tongue portions.

Additionally, the first tongue portion may include an upright portion extending in the direction perpendicular to the surface of the mount portion and a table portion extending in a direction parallel to the surface of the mount portion so that the head IC chip mounting portion is formed in the table portion.

According to this invention, since the head IC chip is mounted to the table portion which extends parallel to the mount portion, the head IC chip can be located in a space between adjacent discs even if the head IC chip is large. That is, this invention is effective when a large size head IC chip is used.

In one embodiment, the mount portion may be made of a metal plate, and the upright portion and the table portion may be formed by bending the metal plate.

Additionally, there is provided according to the present invention a head slider supporting device comprising:

A) a suspension comprising:
 a mount portion;
 a head slider mounting portion formed on an end of the suspension opposite to the mount portion;
 a first tongue portion formed along one side of the mount portion, the first tongue portion protruding from the mount portion in a direction perpendicular to a surface of the mount portion;
 a second tongue portion formed along another side of the mount portion, the second tongue portion protruding from the mount portion in the same direction as the first tongue portion;
 a first wiring pattern extending from the head slider mounting portion to the first tongue portion;
 a second wiring pattern extending from the first tongue portion to the second tongue portion by traversing the mount portion;
 a head IC chip mounting portion formed in the first tongue portion; and
 a connecting portion formed in the second tongue portion;

B) a head slider mounted on the head slider mounting portion;

C) a head IC chip mounted on the head IC chip mounting portion of the first tongue portion;

D) a connecting wire having one end connected to the connecting portion of the second tongue portion; and E) an interconnecting member on which the mount portion of the suspension is mounted.

According to the above-mentioned invention, since the first tongue portion and the second tongue portion are positioned on opposite sides of the mount portion, an operation for connecting a wire to the connecting portion and an operation for mounting the head IC chip to the head IC chip mounting portion can be performed with good operability. Additionally, since the suspension is mounted to the interconnecting member and sequentially mounted to an arm which moves the head slider supporting device, an easy assembling operation of the head slider supporting device can be achieved.

Additionally, there is provided according to the present invention a disc apparatus comprising:

A) a rotating disk;

B) an actuator;

C) an arm driven by the actuator; and

D) a head slider supporting device comprising:
 D-1) a suspension comprising:
  a mount portion;
  a head slider mounting portion formed on an end of the suspension opposite to the mount portion;
  a first tongue portion formed along one side of the mount portion, the first tongue portion protruding from the mount portion in a direction perpendicular to a surface of the mount portion;
  a second tongue portion formed along another one side of the mount portion, the second tongue portion protruding from the mount portion in the same direction as the first tongue portion;
  a first wiring pattern extending from the head slider mounting portion to the first tongue portion;
  a second wiring pattern extending from the first tongue portion to the second tongue portion by traversing the mount portion;
  a head IC chip mounting portion formed in the first tongue portion; and
  a connecting portion formed in the second tongue portion;
 D-2) a head slider mounted on the head slider mounting portion;
 D-3) a head IC chip mounted on the head IC chip mounting portion of the first tongue portion;
 D-4) a connecting wire having one end connected to the connecting portion of the second tongue portion; and
 D-5) an interconnecting member having a first end and a second end, the first end connected to the mount portion of the suspension, the second end connected to the arm.

According to the above-mentioned invention, since the first tongue portion and the second tongue portion are positioned on opposite sides of the mount portion, an operation for connecting a wire to the connecting portion and an operation for mounting the head IC chip to the head IC chip mounting portion can be performed with good operability. Additionally, since the suspension is mounted to the interconnecting member and sequentially mounted to an arm which moves the head slider supporting device, an easy assembling operation of the disc apparatus can be achieved.

Other objects, features and advantages of the present invention will become more apparent from the following detailed description when read in conjunction with the accompanying drawings.

BRIEF DESCRIPTION OF THE DRAWINGS

FIGS. 2A to 2D are enlarged views of parts of the magnetic head slider supporting device shown in FIG. 1;

DETAILED DESCRIPTION OF THE PREFERRED EMBODIMENTS

First Embodiment

Figure 1:
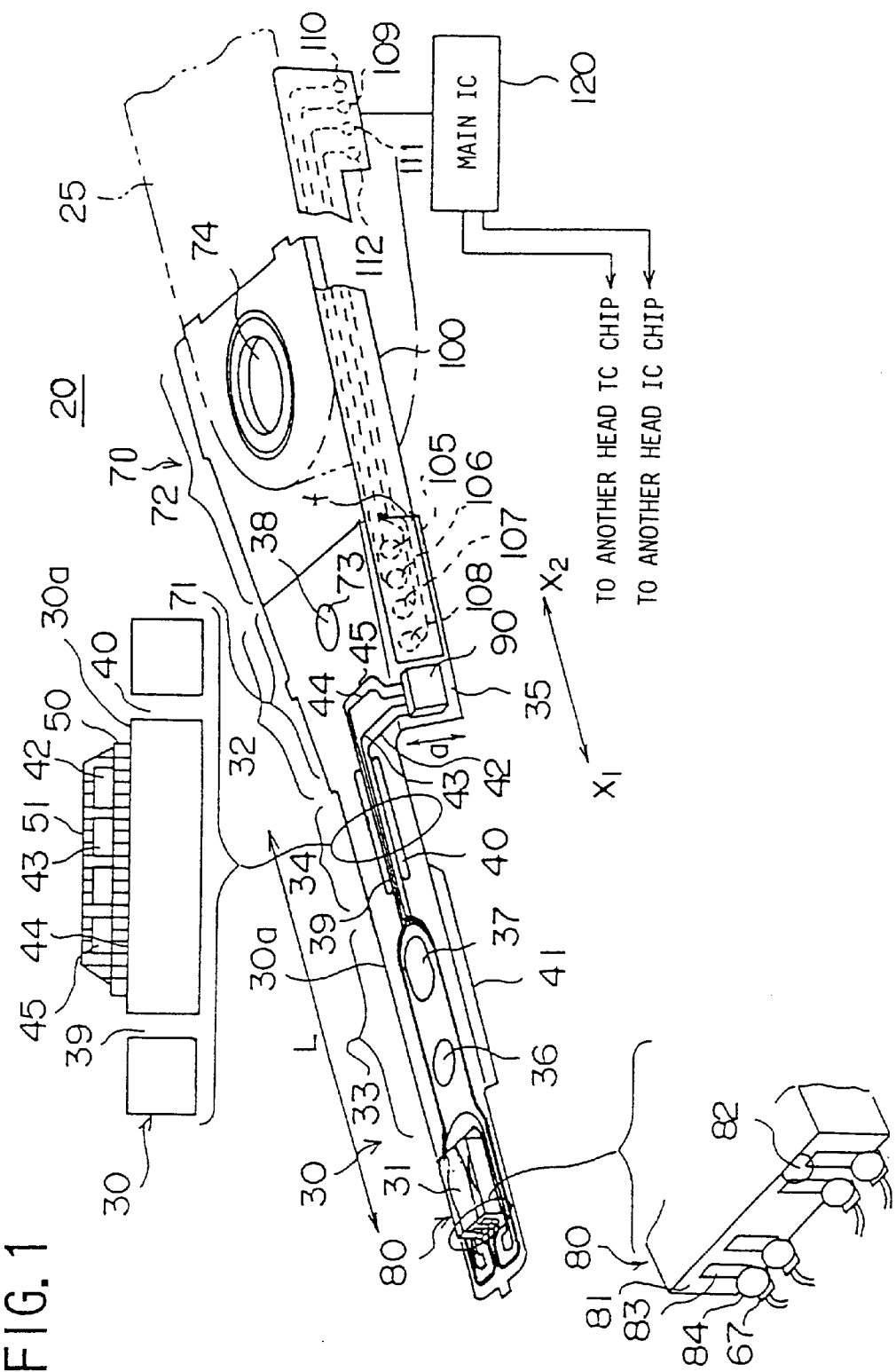
FIG. 1 is a perspective view of a magnetic head slider supporting device according to a first embodiment of the present invention.
Figure 3A:
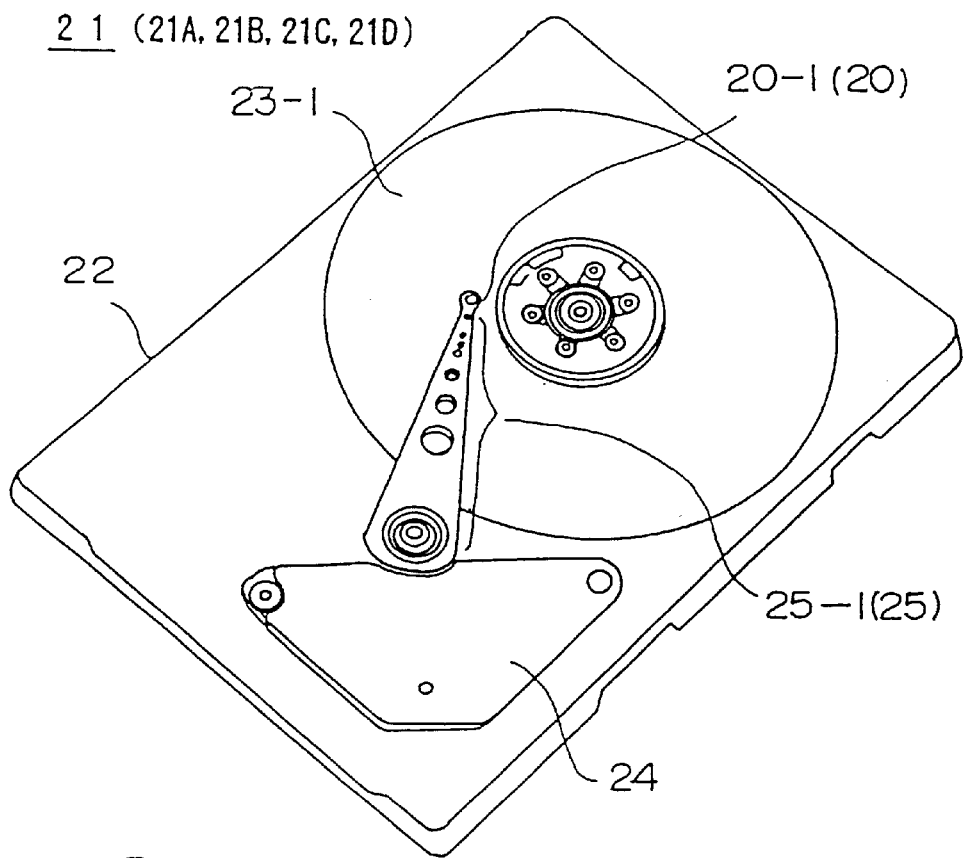
FIG. 3A is a perspective view of a magnetic disc apparatus having the magnetic head slider supporting device shown in FIG. 1.
Figure 3B:
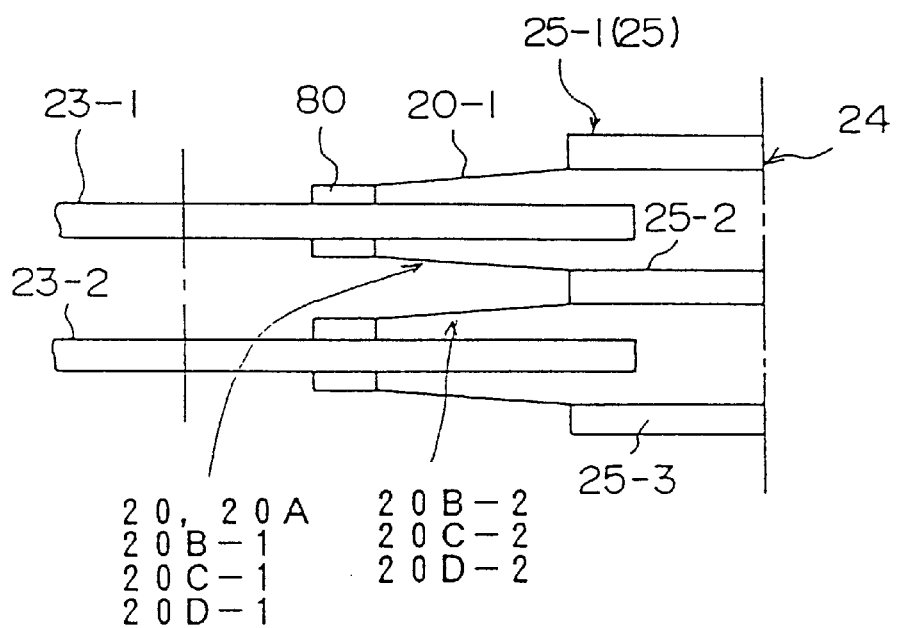
FIG. 3B is an enlarged view of a part of the magnetic disc apparatus shown in FIG. 3A.

A description will now be given of a first embodiment of the present invention. FIG. 1 is a perspective view of a magnetic head slider supporting device 20 according to the first embodiment of the present invention. FIGS. 2A to 2D are enlarged views of parts of the magnetic head slider supporting device 20 shown in FIG. 1. FIG. 3A is a perspective view of a magnetic disc apparatus 21 having the magnetic head slider supporting device 20 shown in FIG. 1. FIG. 3B is an enlarged view of a part of the magnetic disc apparatus 21 shown in FIG. 3A.

The magnetic disc apparatus 21 comprises two rotatable magnetic discs 23-1 and 23-2, an electromagnetically driven actuator 24 having a coil and a permanent magnet, arms 25-1, 25-2 and 25-3 rotated by the actuator 24 and magnetic head slider supporting devices 20-1, 20-2, 20-3 and 20-4 which are mounted to the corresponding arms 25-1 to 25-3. These parts are accommodated in a housing 22. The magnetic discs 23-1 and 23-2 are rotated and the actuator 24 is driven so that the arms 25-1, 25-2 and 25-3 are rotated. The magnetic head slider supporting devices 20-1 to 20-4 are moved together with the arms 25-1 to 25-3 so that access is provided to predetermined tracks of the magnetic discs 23-1 and 23-2 so as to perform an information recording and reproducing operation. A distance between the magnetic discs 23-1 and 23-2 is as small as 2 mm.

Each of the magnetic head slider supporting devices 20-1 to 20-4 have the same structure, and reference numeral 20 is used for indicating one of the magnetic head slider supporting devices 20-1 to 20-4.

The magnetic head slider supporting device 20 comprises, as shown in FIG. 1, a load beam (hereinafter referred to as suspension) 30, an interconnecting member (spacer) 70, a magnetic head slider 80, a bare head IC chip 90 and a flexible printed wiring board 100.

A description will be given of each part constituting the magnetic head slider supporting device 20.

A description will now be given of the suspension 30. The suspension 30 is made of a stainless steel plate having a thickness of 25 $\mu$m. The suspension 30 includes a magnetic head slider supporting section 31 having a gimbal structure at a free end (X1 side) and a mount section 32 which is mounted to the interconnecting member 70 on a base end (X2 side). Additionally, the suspension 30 includes a rigid section 33 and an elastically bendable section 34 between the magnetic head slider supporting section 31 and the mount section 32. The rigid section 33 extends from the magnetic head slider supporting section 31, and has a high rigidity, that is, it is not bendable. The elastically bendable section 34 can be elastically bent, and extends between the rigid section 33 and the mount section 32. The mount section 32 has a tongue portion 35 on one side thereof along a longitudinal direction. A width "a" of the tongue portion 35 which extends from the mount section 32 is about 1 mm. The width "a" is determined by a size of the bare head IC chip 90. A plurality of openings 36, 37 and 38 are formed in the suspension 30. A plurality of slits 39 and 40 are also formed in the suspension 30. The slits 39 and 40 are formed in the elastically bendable section 34, and extend in the longitudinal direction of the suspension 30 so as to facilitate elastic bending of the elastically bendable section 34. The rigidity of the rigid section 33 is provided by rib portions 41 (only one shown in the figure) formed on opposite sides of the suspension 30. The rib portions 41 are formed by bending. A length L between the magnetic head slider supporting section 31 and an end of the elastically bendable section 34 connected to the mount section 32 is as short as 7 mm.

Four copper wiring patterns 42, 43, 44 and 45 for signal transmission are formed on a top surface 30a of the suspension 30 so as to extend from the magnetic head slider supporting section 31 to the mount section 32 through the rigid section 33 and the elastically bendable section 34. As shown in FIG. 2, ends of the wiring patterns 42, 43, 44 and 45 are provided with fine pads 46, 47, 48 and 49, respectively, and are located on the tongue portion 35. The wiring patterns 42, 43, 44 and 45 are formed on a polyimide base layer 50 provided on the top surface 30a of the suspension 30, and are protected by a cover layer 51 made of polyimide. Since the abovementioned distance L is as short as 7 mm, a length of each of the wiring patterns 42, 43, 44 and 45 is also short. Thus, an inductance of each of the wiring patterns 42, 43, 44 and 45 is small, and a capacitance provided by a pair of adjacent wiring patterns 42, 43, 44 and 45 is also small.

As shown in FIG. 2A, a plurality of fine pads 52, 53, 54 and 55, a plurality of pads 56, 57, 58 and 59 and a plurality of wiring patterns 61, 62, 63 and 64 for signal transmission are also formed on the tongue portion 35. The fine pads 46, 47, 48 and 49 and the fine pads 52, 53, 54 and 55 are arranged on the X1 side of the tongue portion 35. The pads 56, 57, 58 and 59 are arranged in a direction indicated by arrows X1 and X2. Each of the pads 56, 57, 58 and 59 are a few times larger than each of the fine pads 52, 53, 54 and 55. The wiring patterns 61, 62, 63 and 64 connect the fine pads 52, 53, 54 and 55 to the pads 56, 57, 58 and 59, respectively. Similar to the wiring patterns 42, 43, 44 and 45, the wiring patterns 61, 62, 63 and 64 are formed on a polyimide base layer, and are protected by a cover layer made of polyimide.

A bare head IC chip mounting portion 65 is formed by a portion including the fine pads 46, 47, 48 and 49 and the fine pads 52, 53, 54 and 55. A flexible printed board connecting portion 66 is formed by a portion including the pads 56, 57, 58 and 59.

It should be noted that the positional relationship between the fine pads 46, 47, 48 and 49, the fine pads 52, 53, 54 and 55 and the pads 56, 57, 58 and 59 can be reversed in the direction X1-X2, or other arrangement may be used.

A description will now be given of the interconnecting member 70. As shown in FIG. 1, the interconnecting member 70 is made of a stainless steel plate having a thickness of 0.20 mm. The interconnecting layer 70 includes a suspension mount section 71 on an end (X1 side) and a mount section 72 on a base end (X2 side) which is fixed to the arm 25. The suspension mount section 71 includes a protruding portion 73. The mount section 72 includes an opening 74 for caulking. The interconnecting member 70 serves to fix the suspension 30 to the arm 25, that is, the interconnecting member 70 functions to mount the magnetic head slider supporting device 20 to the arm 25.

A description will now be given of the magnetic head slider 80. As shown in FIG. 1, the magnetic head slider 80 is referred to as a picoslider. The magnetic head slider 80 includes a head 82, wiring patterns (not shown in the figure) and electrodes 83 provided on an end of each of the wiring patterns. The head 82 is formed by a thin-film forming method by utilizing an inductance head for recording and a magnetoresistance element or a macro magnetoresistance element for reproduction.

A description will now be given of the bare head IC chip 90. As shown in FIGS. 2C and 2D, the bare head IC chip 90 has an integrated circuit 92 formed on a bottom surface 91 thereof. The integrated circuit 92 is covered by a protective film 93. A plurality of fine bumps are formed on the bottom surface 91. The arrangement of the fine bumps 84 matches the arrangement of the fine pads 46 to 49 and 52 to 55. The integrated circuit 92 has a circuit for amplifying a signal reproduced by the head 82. A dimension "b" of one side of the bare head IC chip 90 is slightly less than, 1 mm, which is much smaller than a dimension (5 mm) of one side of a conventional head IC which is sealed by a synthetic resin. A thickness "c" of the bare head IC chip 90 is 0.3 mg, which is much smaller than a thickness (2 mm) of the conventional IC head which is sealed by a synthetic resin. A weight of the bare head IC chip 90 is 0.5 mg, which is much lighter than a weight (10 mg) of the conventional head IC which is sealed by a synthetic resin.

A description will now be given of the flexible printed board 100. As shown in FIG. 2B, the flexible printed board 100 is a belt member having a width "e" of about 1 mm. The flexible printed board 100 has four wiring patterns 101, 102, 103 and 104 which extend in the direction X1–X2. Four pads 105, 106, 107 and 108 are provided on ends of the wiring patterns 101, 102, 103 and 104. The flexible printed board 100 also has four pads 109, 110, 111 and 112 on an end opposite to the end where the pads 105 to 108 are formed. The pads 105 to 108 are arranged along a line, and the pads 105 to 108 and the pads 56, 57, 58 and 59 are arranged in the same relationship.

A description will now be given of a structure of the magnetic head slider supporting device 20.

As shown in FIG. 1, the suspension 30 is positioned by the opening 38 being fit on the protruding portion 73, and the mount section 32 is placed on and fixed to a suspension mount portion 71 of the interconnecting part 70. The tongue portion 35 is located on a side of the interconnecting member 70. The elastically bendable section 34 extends from the interconnecting member 70. The magnetic head slider 80 is secured to the magnetic head slider mounting section 31 by adhesive, and the electrodes 83 are connected to the corresponding pads 67 provided on ends of the wiring patterns 42, 43, 44 and 45 by gold (Au) balls 84 attached by a heat press method. The bare head IC chip 90 is a face-down flip chip type. The fine bumps 94 are connected to the fine pads 46–49 and 52–55. The bare head IC chip 90 is mounted on the bare head IC chip mounting portion 65 by a heat pressing method, an ultrasonic method or an adhesive. Additionally, the flexible printed board 100 connects the pads 105 to 108 to the pads 56 to 59 so as to be connected to the flexible printed board mounting portion 66, and extends in a direction X2.

Since the size of the bare head IC chip 90 is much smaller than the conventional head IC, the width "a" of the tongue portion 35 can be as small as about 1 mm, and a dimension "f" of extension of the tongue portion 35 downwardly from a bottom surface of the interconnecting member 70 is as short as 0.8 mm. The above-mentioned magnetic head slider supporting device 20 is fixed to an end of the arm 25 by utilizing the opening 74 for caulking in the mount portion 72 of the interconnecting member 70. The magnetic head slider supporting device 20 extends in a direction of the axis of the arm 25.

The pads 109 to 112 on the opposite end of the flexible printed board 100 are connected to a circuit board (not shown in the figures) of the magnetic disc apparatus 21, and sequentially connected to a main IC 120 mounted on the circuit board. The main IC 120 has a recording and reproducing circuit and an amplifying circuit, and is sealed by a synthetic resin.

Other magnetic head slider supporting devices shown in FIG. 3B have the same construction as the above-mentioned magnetic head slider supporting device 20. Thus, a flexible printed board of other magnetic head slider supporting devices is connected to the main IC 120.

The above-mentioned magnetic head slider supporting device 20 (the magnetic disc apparatus 21) has the following features.

1) Since the length of the wiring patterns 42, 43, 44 and 45 are short, the inductance of each of the wiring patterns 42, 43, 44 and 45 is small. Additionally, a capacitance provided between adjacent wiring patterns 42, 43, 44 and 45 is small. Thus, the magnetic disc apparatus 21 can write and read a signal of up to 200 MHz which is beyond the current frequency of 70 MHz.

2) Since the bare head IC chip 90 is mounted on the tongue portion 35 which is located on one side of the suspension 30, a weight of the bare head IC chip 90 is irrelevant to a contact pressure of the magnetic head slider 80 against the magnetic disc 23. Accordingly, the weight of the bare head IC chip 90 does not provided adverse influence to floating stability of the magnetic head slider 80 with respect to the magnetic disc 23. Additionally, if a strong shock is applied to the magnetic disc apparatus 21 and a head crash occurs in which the magnetic head slider 80 contacts the magnetic disc 23, energy of the head crash can be reduced.

3) Since the bare head IC chip 90 is mounted on the tongue portion 35, the width "a" of the tongue portion 35 is as small as about 1 mm, and the dimension "f" of the extension of the tongue portion from the bottom surface of the interconnecting member 70 is as small as 0.8 mm. Thus, there is no possibility that the tongue portion 35 (bare head IC chip 90) interferes with another tongue portion (another bare head IC chip) provided in an adjacent magnetic head slider supporting device.

A description will now be given of an assembling method of the magnetic head slider supporting device 20.

The magnetic head slider supporting device 20 is assembled in a procedure in which the head 82 of the magnetic head slider 80 is not statically destroyed.

Figure 4:
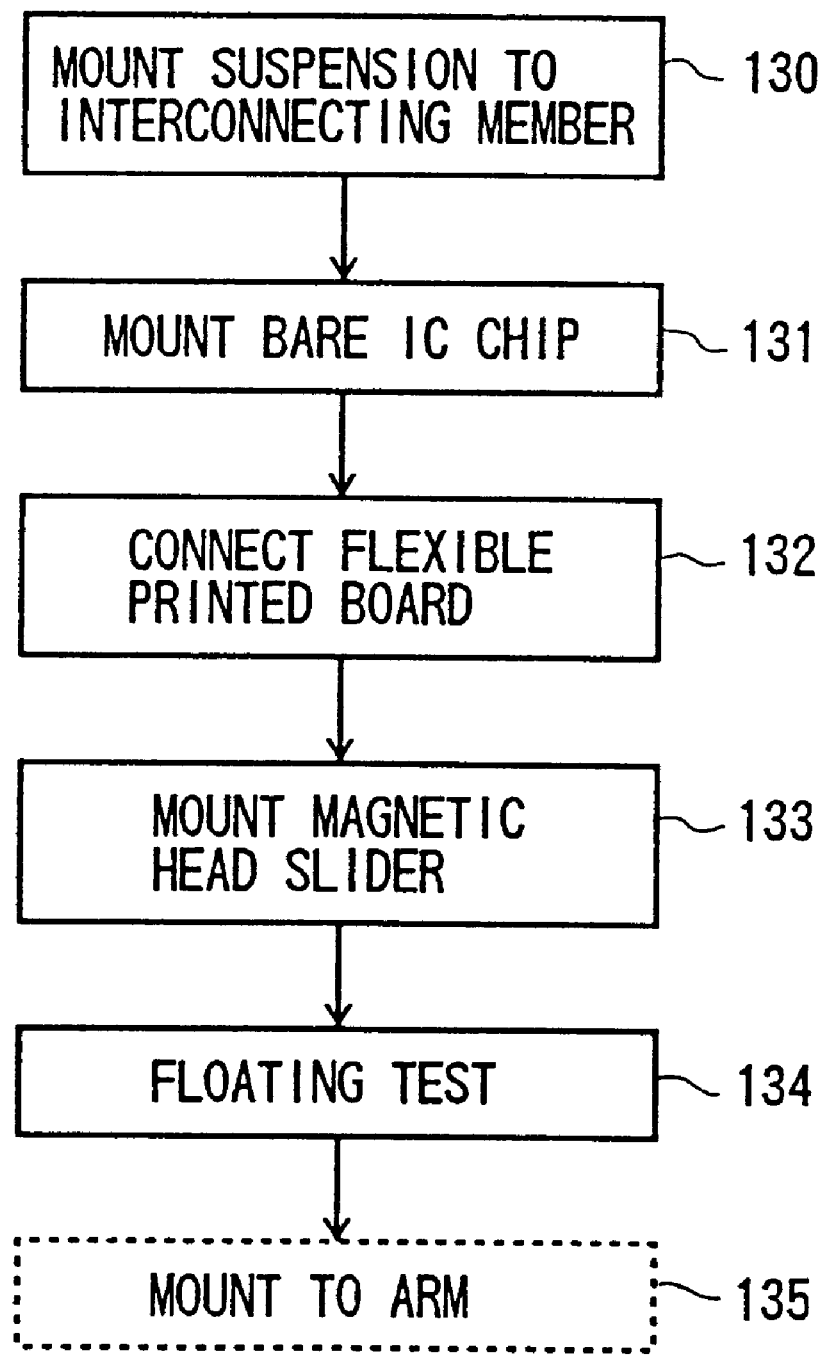
FIG. 4 is a flowchart of an assembling operation of the magnetic head slider supporting device shown in FIG. 1.

FIG. 4 is a flowchart of an assembly operation of the magnetic head slider supporting device 20. As shown in FIG. 4, the suspension 30 is first mounted to the interconnecting member 70 (step 130). Then, the bare head IC chip 90 is mounted before the magnetic head slider 80 is mounted (step 130). The flexible printed board 100 is connected (step 132). Thereafter, the magnetic head slider 80 is mounted (step 130). Thereby, the magnetic head slider supporting device 20 is completed. Since the bare head IC chip 90 has already been mounted, the head 82 is prevented from being statically destroyed during an operation for mounting the magnetic head slider 80 or handling after the magnetic head slider 80 is mounted.

Thereafter, a floating test is performed for the magnetic head slider 80 (step 134). Since the bare head IC chip 90 is mounted, the head 82 is prevented from being statically destroyed during the floating test of the magnetic head slider 80. Then, the magnetic head slider supporting device 20 is mounted to the arm 25 (step 135).

Figure 5:
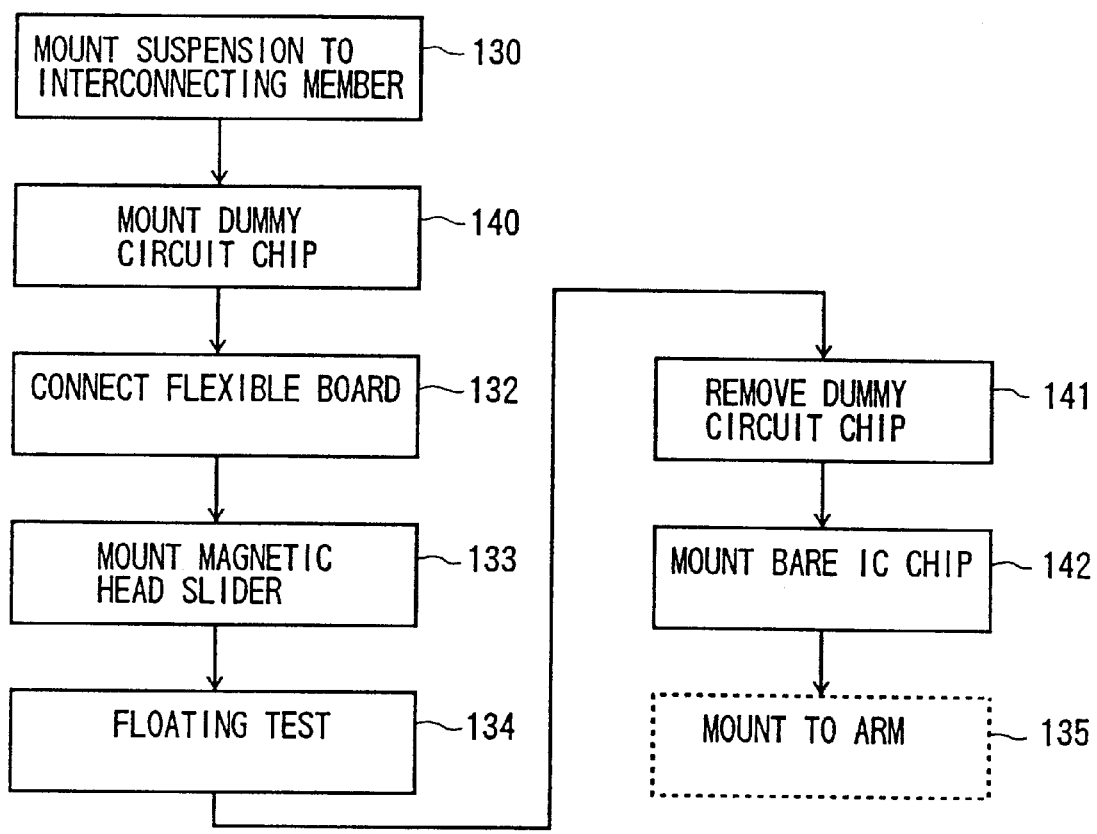
FIG. 5 is a flowchart of another assembling operation of the magnetic head slider supporting device shown in FIG. 1.

FIG. 5 is a flowchart of another assembly operation of the magnetic head slider supporting device 20. This assembling operation uses a dummy circuit chip.

The dummy chip circuit is the same size as that of the bare head IC chip 90. The dummy chip circuit has the same number of fine bumps provided in the same arrangement as the fine bumps 94 of the bare head IC chip 90. Additionally, the dummy circuit chip has a short circuit which interconnects the corresponding fine bumps by wiring patterns. When the dummy circuit chip is mounted to the bare head IC chip mounting portion 65, the fine pads 46 to 49 and the corresponding fine bumps 52 to 55 are short circuited.

In FIG. 5, steps that are the same as the steps shown in FIG. 4 are given the same step numbers.

After step 130, the dummy circuit chip is mounted to the bare head IC chip mounting portion 65 (step 140). Thereafter, steps 132, 133 and 143 are performed. Since the dummy circuit chip is mounted on the base head IC chip mounting portion 65 and the fine pads 46 to 49 and the corresponding fine pads 52 to 55 are short circuited, the head 82 is protected from being statically destroyed during an operation for mounting the magnetic head slider 80 or for handling after the magnetic head slider 80 is mounted or floating test of the magnetic head slider 80.

After step 134 is completed, the dummy circuit chip 90 is removed (step 141). Then the bare head IC chip 90 is mounted (step 142). Thereafter, process 135 is performed.

Second Embodiment

Figure 6:
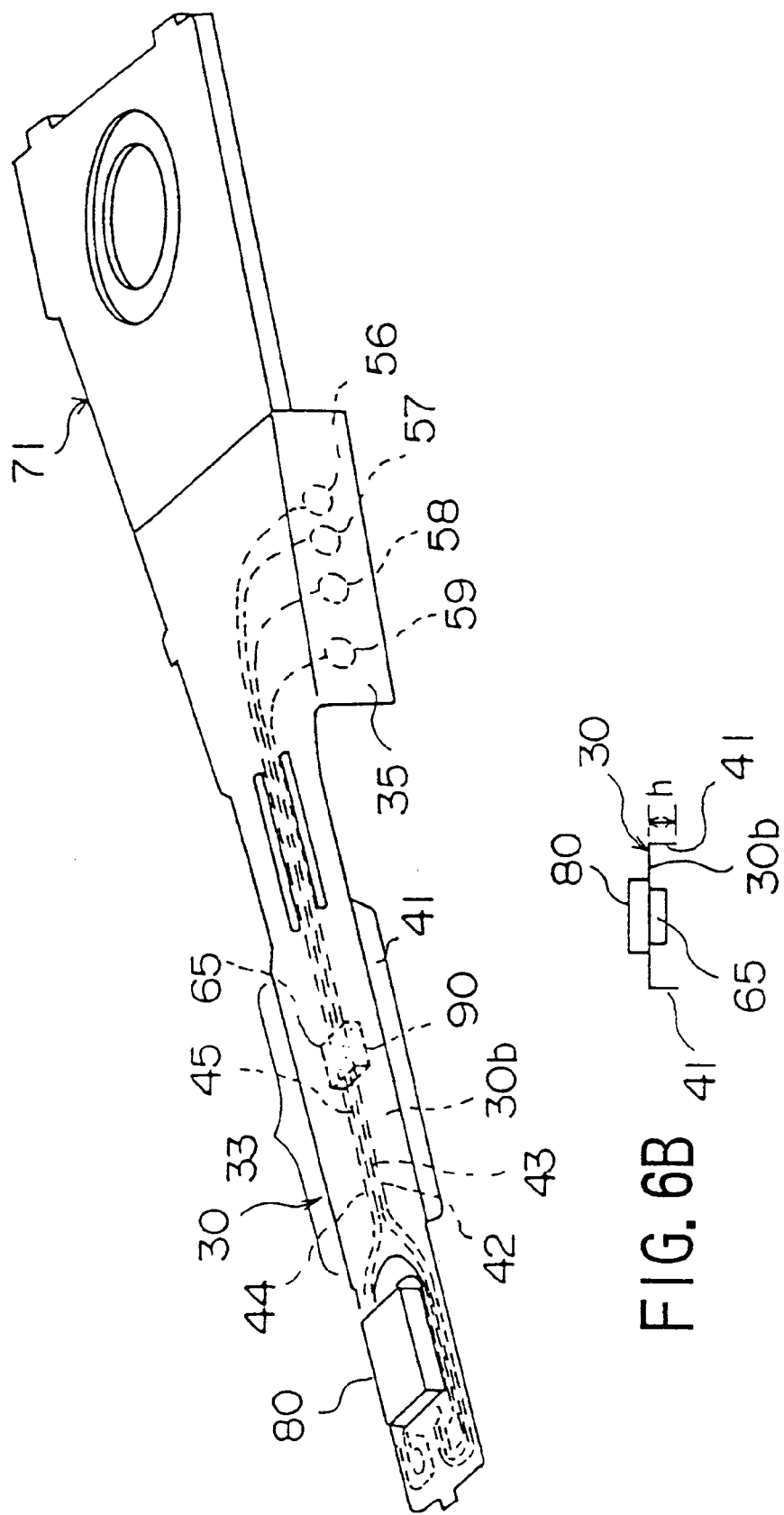
FIGS. 6A and 6B are diagrams of a magnetic head slider supporting device according to a second embodiment of the present invention.

A description will now be given, with reference to FIGS. 6A and 6B, of a magnetic head slider supporting device 20A according to a second embodiment of the present invention.

The magnetic head slider supporting device 20A has the same structure as the magnetic head slider supporting device 20 shown in FIG. 1 except for the position where the bare head IC chip 90 is mounted. In FIGS. 6A and 6B, parts that are the same as the parts shown in FIG. 1 are given the same reference numerals.

In the suspension 30 of the magnetic head slider supporting device 20A, the four wiring patterns 42, 43, 44 and 45 are formed on a bottom surface a side where the rib 41 is uprightly bent. The bare head IC chip mounting portion 65 is formed on the bottom surface 30b within the rigid section 33. The bare head IC chip 90 is mounted on the thus formed bare head IC chip mounting portion 65. As shown in FIG. 6B, since the bare head IC chip 90 is accommodated within a height "h" of the rib 41, there is no interference with an adjacent magnetic head slider supporting device. The length of a wiring pattern from the head to the bare head IC chip 90 is less than that of the magnetic head slider supporting device 20 shown in FIG. 1. Thus, an inductance of each wiring pattern is reduced, and a capacitance provided by adjacent wiring patterns is also reduced. Accordingly, the magnetic disc apparatus 21A using the magnetic head slider supporting device 20A can increase a signal writing frequency more than the magnetic disc apparatus 21 having the magnetic head slider supporting apparatus 20. For example, the magnetic disc apparatus 21A using the magnetic head slider supporting device 20A can write and read a signal having a frequency of 200 to 300 MHz.

Third Embodiment

The following third, fourth and fifth embodiments are directed to a structure in which the tongue portion is provided on each side of the interconnecting member of the suspension, that is, two tongue portions are provided to the interconnecting member so that the bare head IC chip is mounted to one of the tongue portions and an end of the flexible printed board 100 is connected by soldering to the other one of the tongue portions.

FIGS. 7 to 10 show a magnetic head slider supporting device 20B according to the third embodiment of the present invention. In FIGS. 7 to 10, parts that are the same as the parts shown in FIGS. 1 and 2 are given the same reference numerals, and parts that correspond to the parts shown in FIGS. 1 and 2 are given the same reference numerals with a suffix "B".

Figure 8:
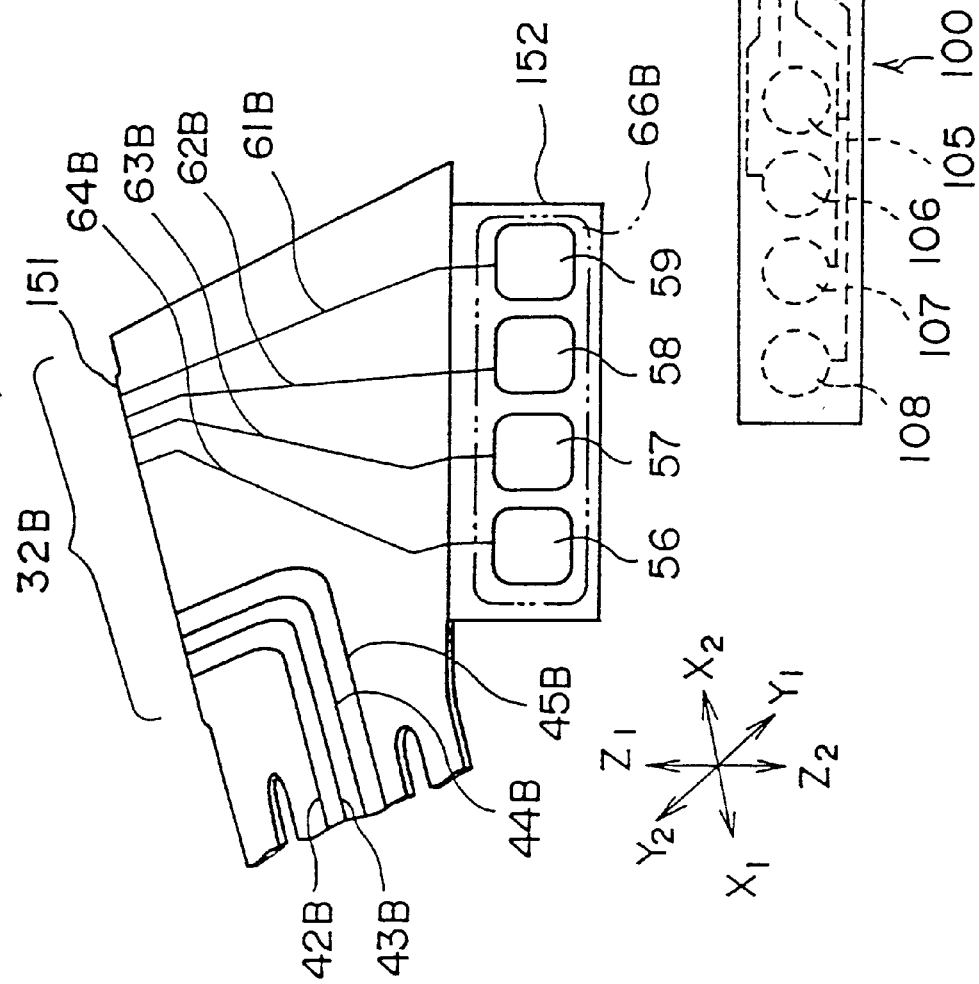
FIG. 8 is an enlarged view of a part surrounded by a circle A of FIG. 7.
Figure 9:
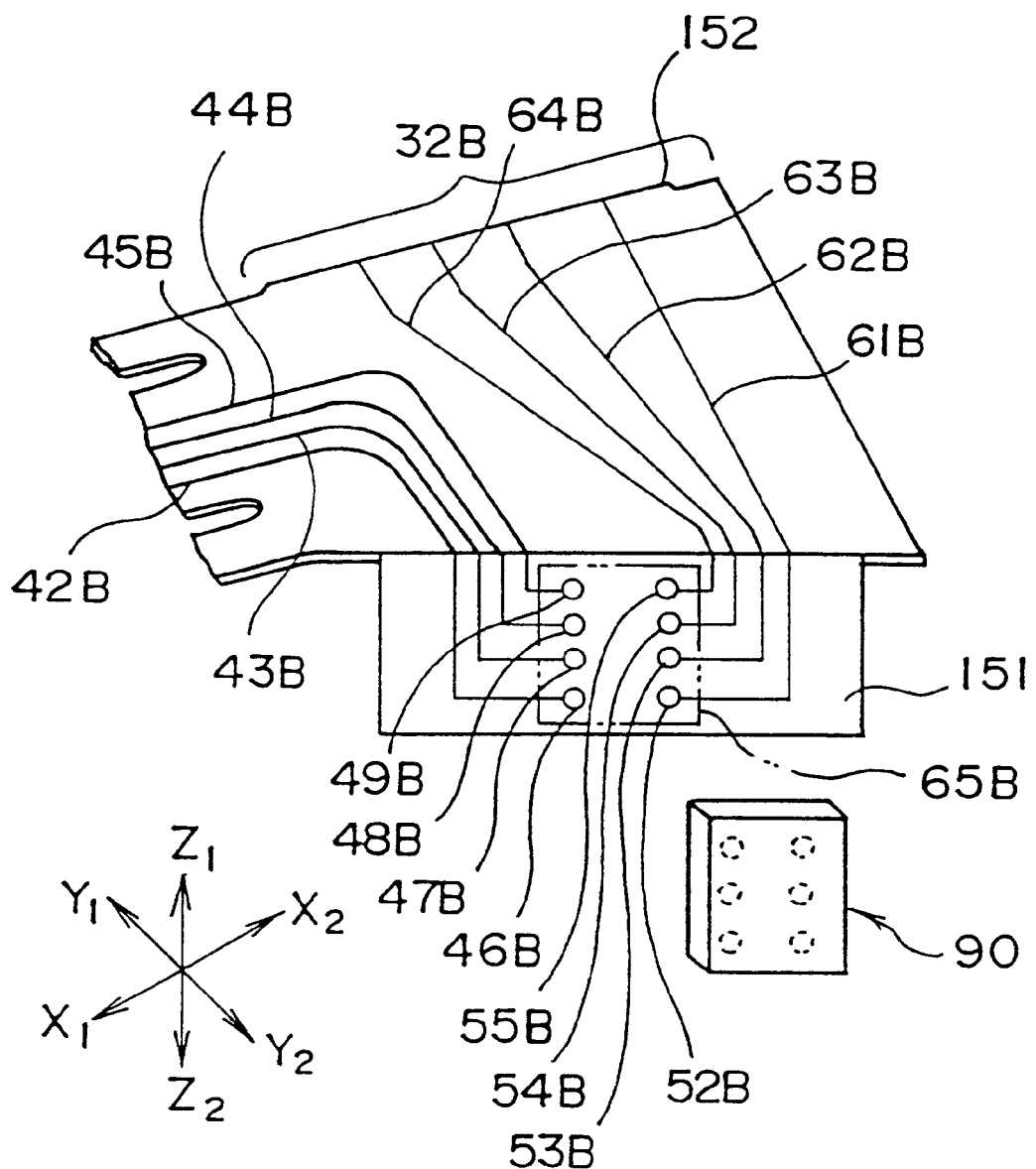
FIG. 9 is a view taken from a direction indicated by a arrow IX of FIG. 7.
Figure 10:
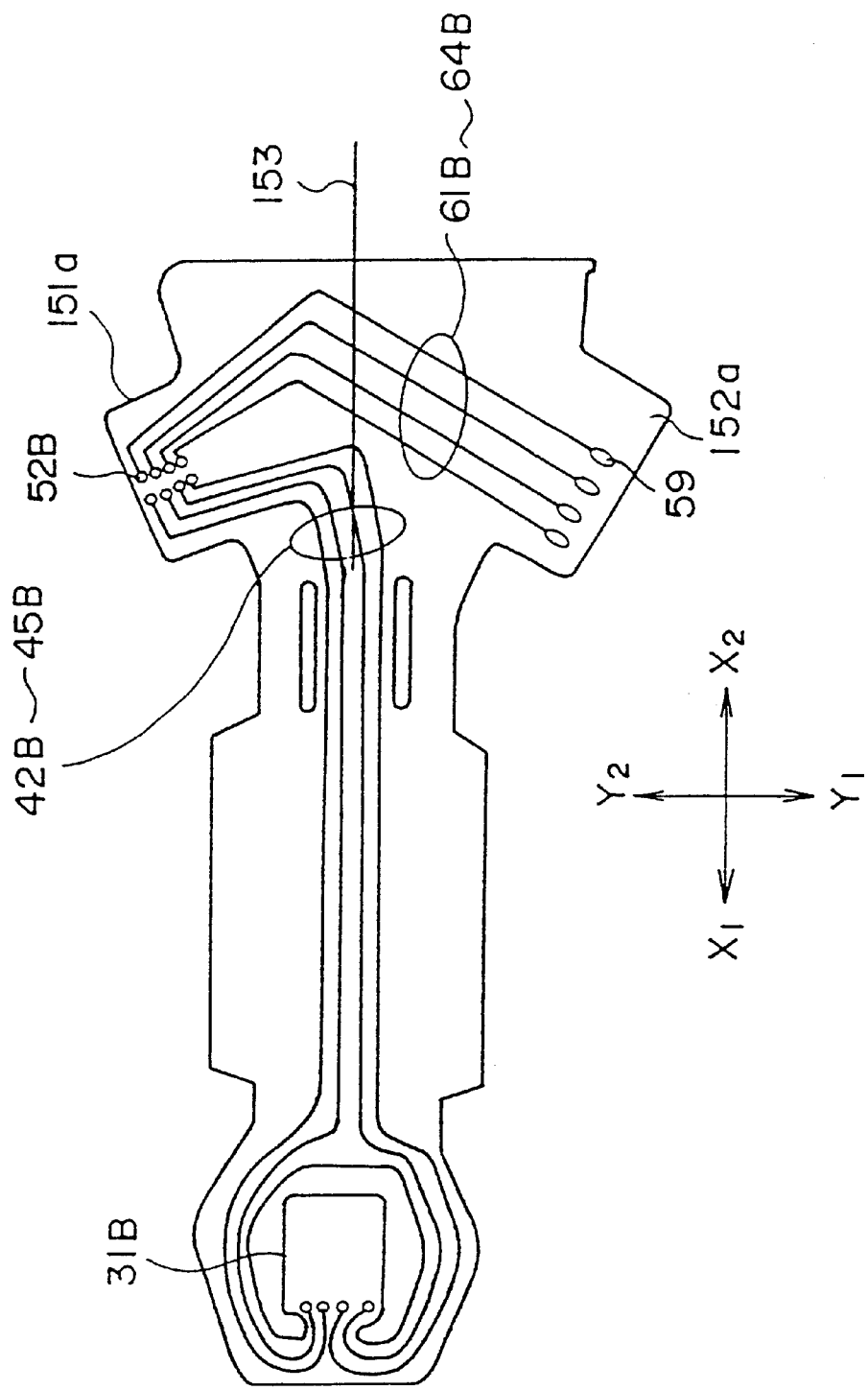
FIG. 10 is an illustration of a suspension shown in FIG. 7 which is expanded.

The magnetic head slider supporting device 20B-1 has a suspension 30B. As shown in FIGS. 8, 9 and 10, a mount section 32B of the suspension mounted to an interconnecting member 70B, has a first tongue portion 151 and a second tongue portion 152. As shown in FIG. 10, the mount section 32B of the suspension 30B has a side portion 151a on a Y2 side and a side portion 152a on a Y1 side, a direction Y1–Y2 being perpendicular to a longitudinal center line 153 of the suspension 30B. The first tongue portion 151 is formed by bending the side portion 151a of the mount section 32B on the Y2 side by 90 degrees in a downward direction (in a direction indicated by an arrow Z). The second tongue portion 152 is formed by bending the side portion 152a of the mount section 32B on the Y1 side by 90 degrees in a downward direction (in the direction indicated by the arrow Z).

As shown in FIG. 9, fine pads 46B, 47B, 48B and 49B and fine pads 52B, 53B, 54B and 55B are formed on the first tongue portion 151. As shown in FIG. 8, pads 56B, 57B, 58B and 59B are formed on the second tongue portion 152.

Four first wiring patterns 42B, 43B, 44B and 45B for signal transmission extend from a magnetic head slider mounting section 31B to the first tongue portion 151 through a rigid section 33B, an elastically bending section 34B and the mount section 32B. Ends of the first wiring patterns 42B, 43B, 44B and 45B are provided with fine pads 46B, 47B, 48B and 49B, respectively. Four second wiring patterns 61B, 62B, 63B and 64B for signal transmission extend from the fine pads 52B, 53B, 54B and 55B, traverse the mount section 32B in the Y1 direction and reach the pads 59B, 58B, 57B and 56B, respectively.

In FIG. 9, a portion encircled by a double dashed chain line, which includes the fine pads 46B, 47B, 48B and 49B and the fine pads 52B, 53B, 54B and 55B, constitutes a bare head IC chip mounting portion 65B. In FIG. 8, a portion encircled by a double dashed chain line, which includes the pads 56B, 57B, 58B and 59B, constitutes a flexible printed board connecting portion 66B.

Figure 7:
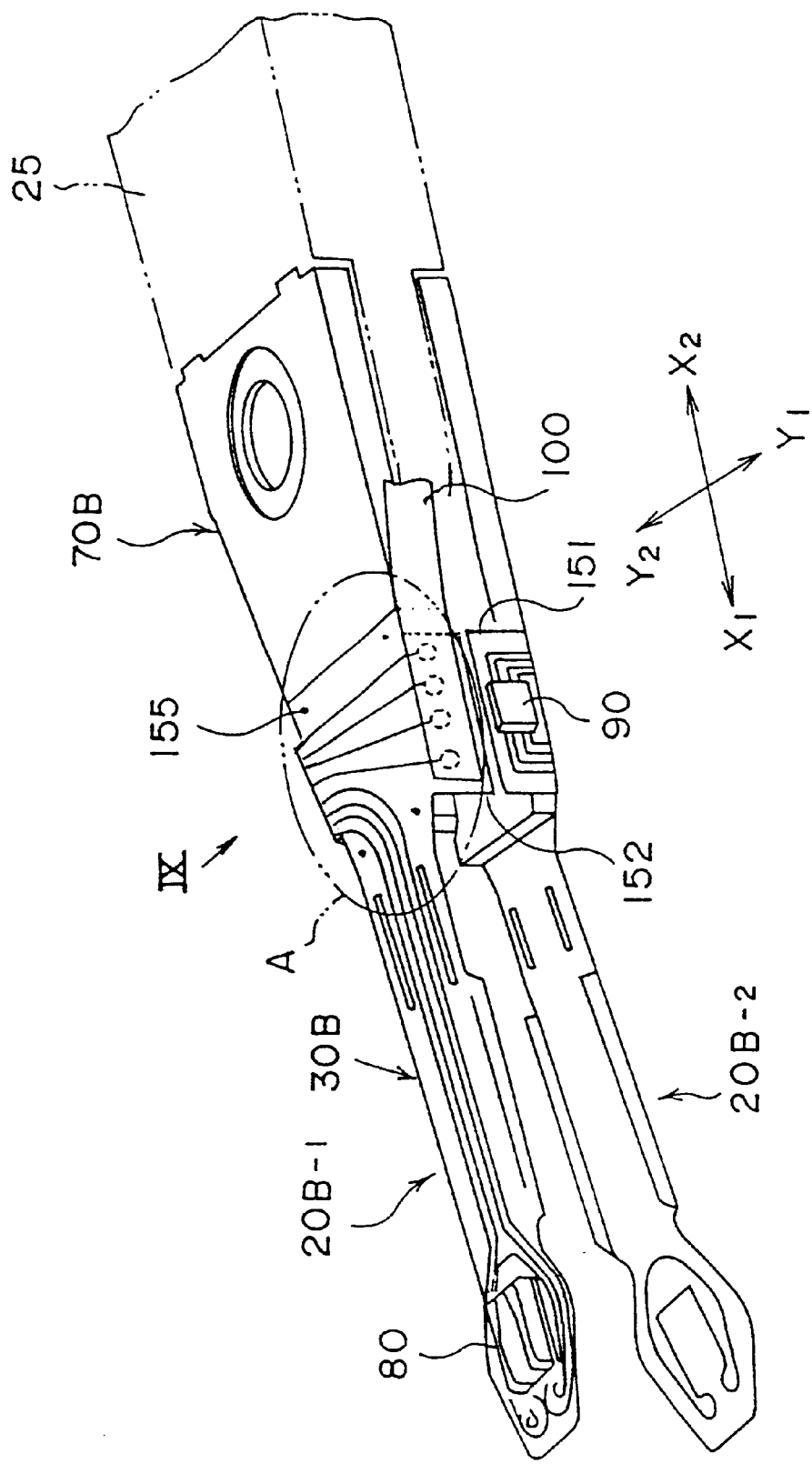
FIG. 7 is a perspective view of magnetic head slider supporting devices according to a third embodiment of the present invention.

In the magnetic head slider supporting device 20B-1, as shown in FIG. 7, the magnetic head slider 80 is mounted on an end of the suspension 30B. The mount section 32B is fixed to the interconnecting member 70B by welding. A point 155 indicates a welded position. The bare head IC chip 90 is mounted on the bare head IC chip mounting portion 65B, and an end of the flexible printed board 100 is soldered to the flexible printed board connecting portion 66B.

The magnetic head slider supporting device 20B-2 has the same structure as the above-mentioned magnetic head slider supporting device 20B-1.

In the magnetic disc apparatus 21B, the interconnecting member 70B of the magnetic head slider supporting device 20B-1 is mounted to an upper side of the arm 25. Additionally, the interconnecting member 70B of the magnetic head slider supporting device 20B-2 is mounted upside down to a lower side of the arm 25. The magnetic head slider supporting devices 20B-1 and 20B-2 are interposed between the magnetic discs 23-1 and 23-2 (refer to FIG. 3B). In this arrangement, the magnetic head slider supporting devices 20B-1 and 20B-2 are in a back-to-back relationship. Thus, the bare head IC chip mounting portion of one of the magnetic head slider supporting devices 20B-1 and 20B-2 and the flexible printed board connecting portion of the other one of the magnetic head slider supporting devices 20B-1 and 20B-2 are positioned on the same side.

In the present embodiment, since the bare head IC chip mounting portion 65B and the flexible printed board connecting portion 66B are formed on the separate tongue portions 151 and 152, respectively, the bare head IC chip 90 does not interfere with an operation for soldering the flexible printed board 100 to the flexible printed board connecting portion 66B. Thus, the operation for soldering the flexible printed board 100 to the flexible printed board connecting portion 66B can be performed smoothly.

Additionally, when the bare head IC chip 90 is mounted to the bare head IC chip mounting portion 65B, the flexible printed circuit board 100 does not interfere with an operation for mounting the bare head IC chip 90. Thus, the operation for mounting the flexible printed circuit board 100 to the flexible printed board connecting portion 66B can be performed smoothly.

It should be noted that the magnetic disc apparatus 20B can write and read a signal having a frequency exceeding 70 MHz and up to 200 MHz since the above-mentioned magnetic head slider supporting devices 20B-1 and 20B-2 are incorporated therein.

Fourth Embodiment

Figure 11:
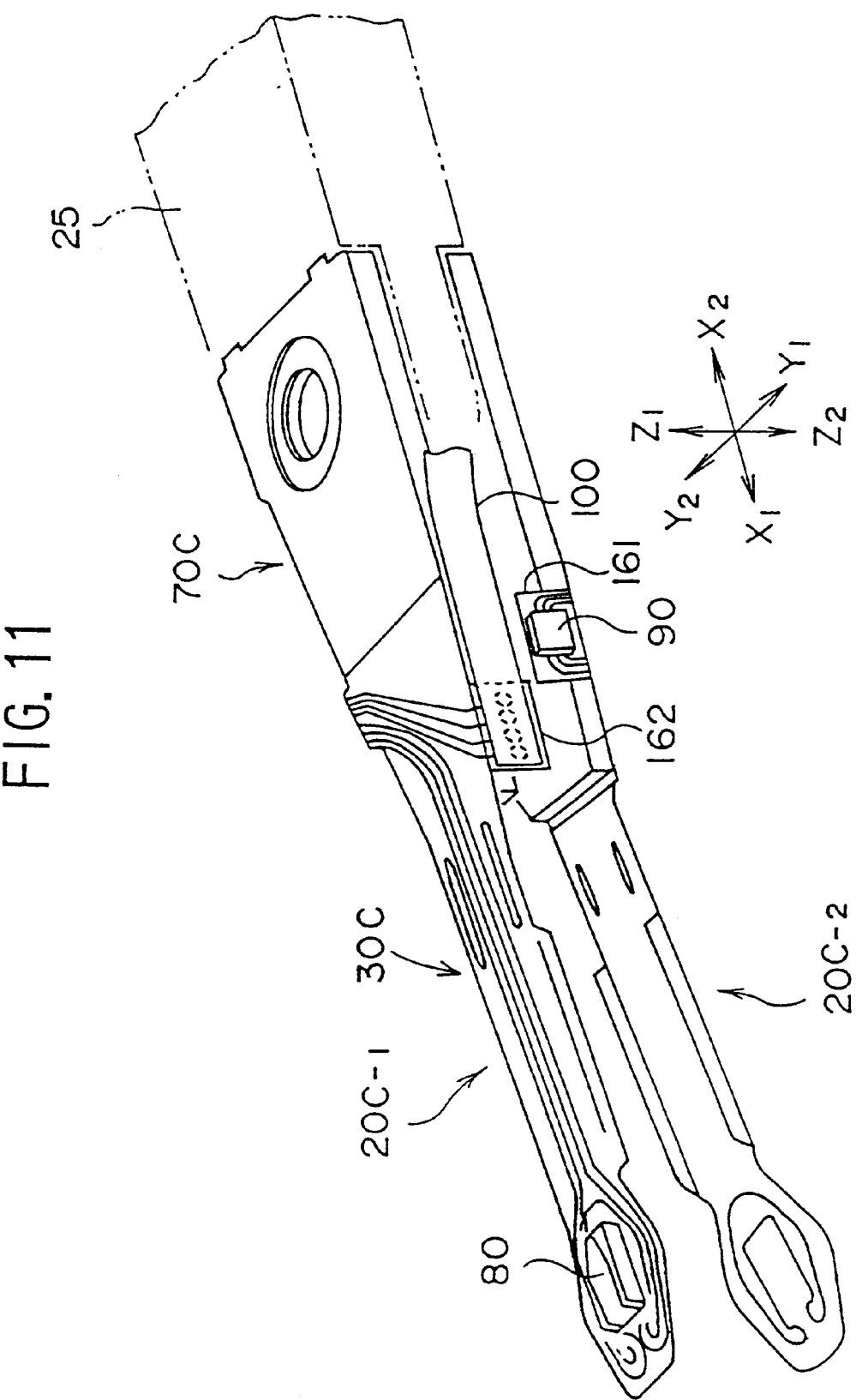
FIG. 11 is a perspective view of magnetic head slider supporting devices according to a fourth embodiment of the present invention.

FIG. 11 shows magnetic head slider supporting devices 20C-1 and 20C-2 according to a fourth embodiment of the present invention. In FIG. 11, parts that are the same as the parts shown in FIGS. 1 and 2 are given the same reference numerals, and parts that correspond to the parts shown in FIGS. 1 and 2 are given the same reference numerals with a suffix "C".

Figure 12:
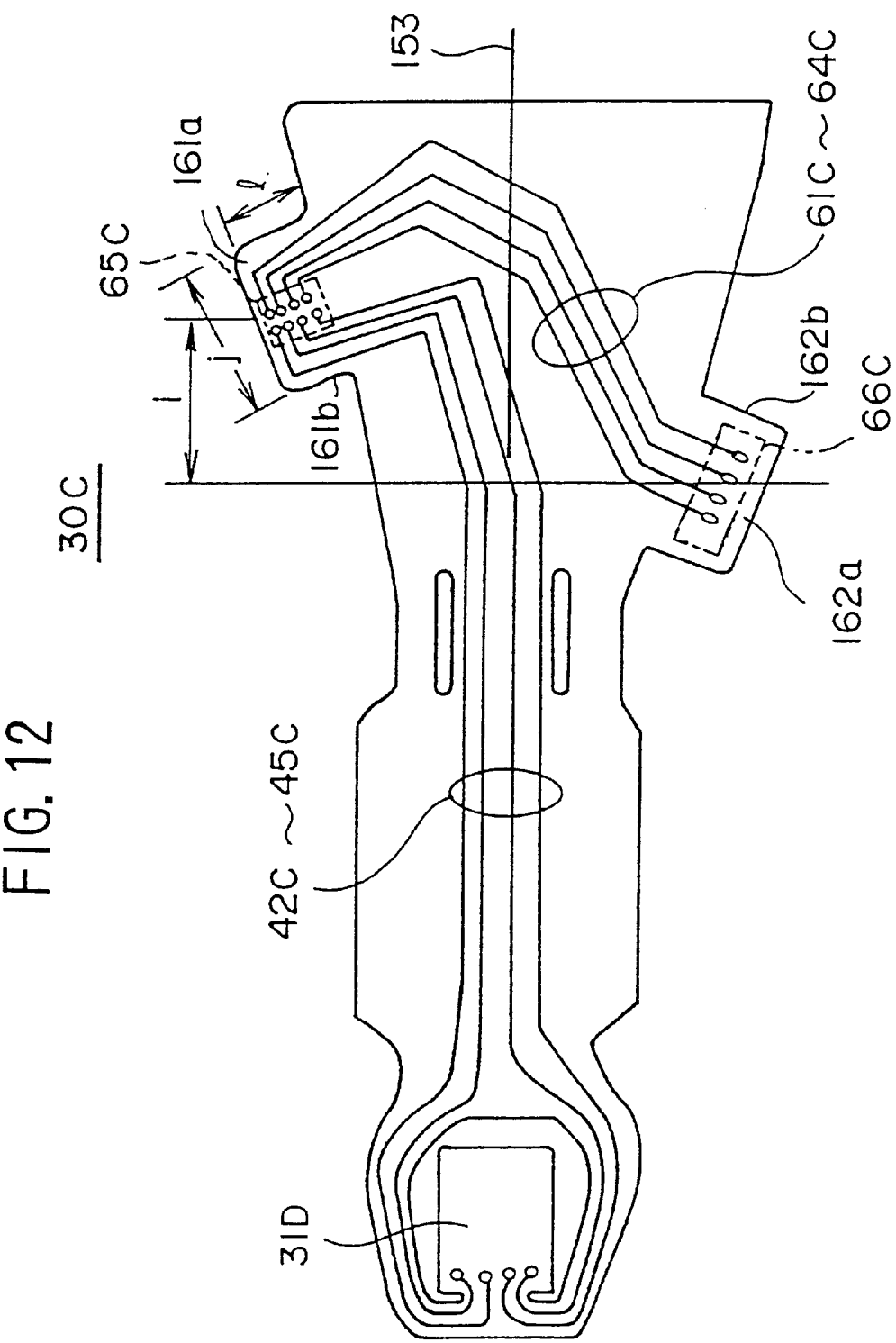
FIG. 12 is an illustration of a suspension shown in FIG. 11 which is expanded.

The magnetic head slider supporting device 20C-1 has a suspension 30C. As shown in FIG. 12, the suspension 30C has the same structure as the suspension 30B shown in FIG. 10 except for a first tongue portion 161 (161a) and a second tongue portion 162 (162a) being offset from each other in the longitudinal center axis 153 by a distance "i". The distance "i" corresponds to a length "j" of the first tongue portion 161 (161a). An end 161b of the first tongue portion 161a and an end 162b of the second tongue portion 162a are located substantially in the same position with respect to the X1–X2 direction.

A bear head IC chip mounting portion 65C is formed in the first tongue portion 161 (161a). A flexible printed board connecting portion 66C is formed in the second tongue portion 162 (162a). First wiring patterns 42C, 43C, 44C and 45C extend from a magnetic head slider mounting section 31C to the bare head IC chip mounting portion 65C. Second wiring patterns 61C, 62C, 63C and 64C traverse the mount section 32C and extend to the flexible printed board connecting portion 66C.

In the magnetic head slider supporting device 20C-1, as shown in FIG. 11, the magnetic head slider 80 is mounted on an end of the suspension 30C. The mount section 32C is fixed to the interconnecting member 70C by welding. The bare head IC chip 90 is mounted on the bare head IC chip mounting portion 65B (refer to the magnetic head slider supporting device 20C-2), and an end of the flexible printed board 100 is soldered to the flexible printed board connecting portion 66C.

The magnetic head slider supporting device 20C-2 has the same structure as the above-mentioned magnetic head slider supporting device 20C-1.

In the magnetic disc apparatus 21C, the interconnecting member 70C of the magnetic head slider supporting device 20C-1 is mounted to an upper side of the arm 25. Additionally, the interconnecting member 70C of the magnetic head slider supporting device 20C-2 is mounted upside down to a lower side of the arm 25. The magnetic head slider supporting devices 20C-1 and 20C-2 are interposed between the magnetic discs 23-1 and 23-2 (refer to FIG. 3B).

In the above-mentioned arrangement, the magnetic head slider supporting devices 20C-1 and 20C-2 are in a back-to-back relationship. Thus, the bare head IC chip mounting portion of one of the magnetic head slider supporting devices 20C-1 and 20C-2 and the flexible printed board connecting portion of the other one of the magnetic head slider supporting devices 20C-1 and 20C-2 are positioned on the same side. The bare head IC chip mounting portion 65C of the first tongue portion 161 and the flexible printed board connecting portion 66C of the second tongue portion 162 are formed on the same side. However, the first tongue portion 161 and the second tongue portion 162 are arranged in an offset relationship from each other in the X1–X2 direction. Accordingly, when the flexible printed board 100 is soldered to the flexible printed board mounting portion 66C and when an assembling jig (not shown in the figures) is needed to be inserted in a direction indicated by an arrow Z1 or Z2 so as to press the flexible printed board 100 against the flexible printed board connecting portion 66C, the jig can be inserted without interference of the mounted bare head IC chip 90. Thus, the operation for soldering the flexible printed board 100 to the flexible printed board connecting portion 66C can be performed smoothly.

It should be noted that the magnetic disc apparatus 20C can write and read a signal having a frequency exceeding 70 MHz and up to 200 MHz since the above-mentioned magnetic head slider supporting devices 20C-1 and 20C-2 are incorporated therein.

Fifth Embodiment

Figure 13:
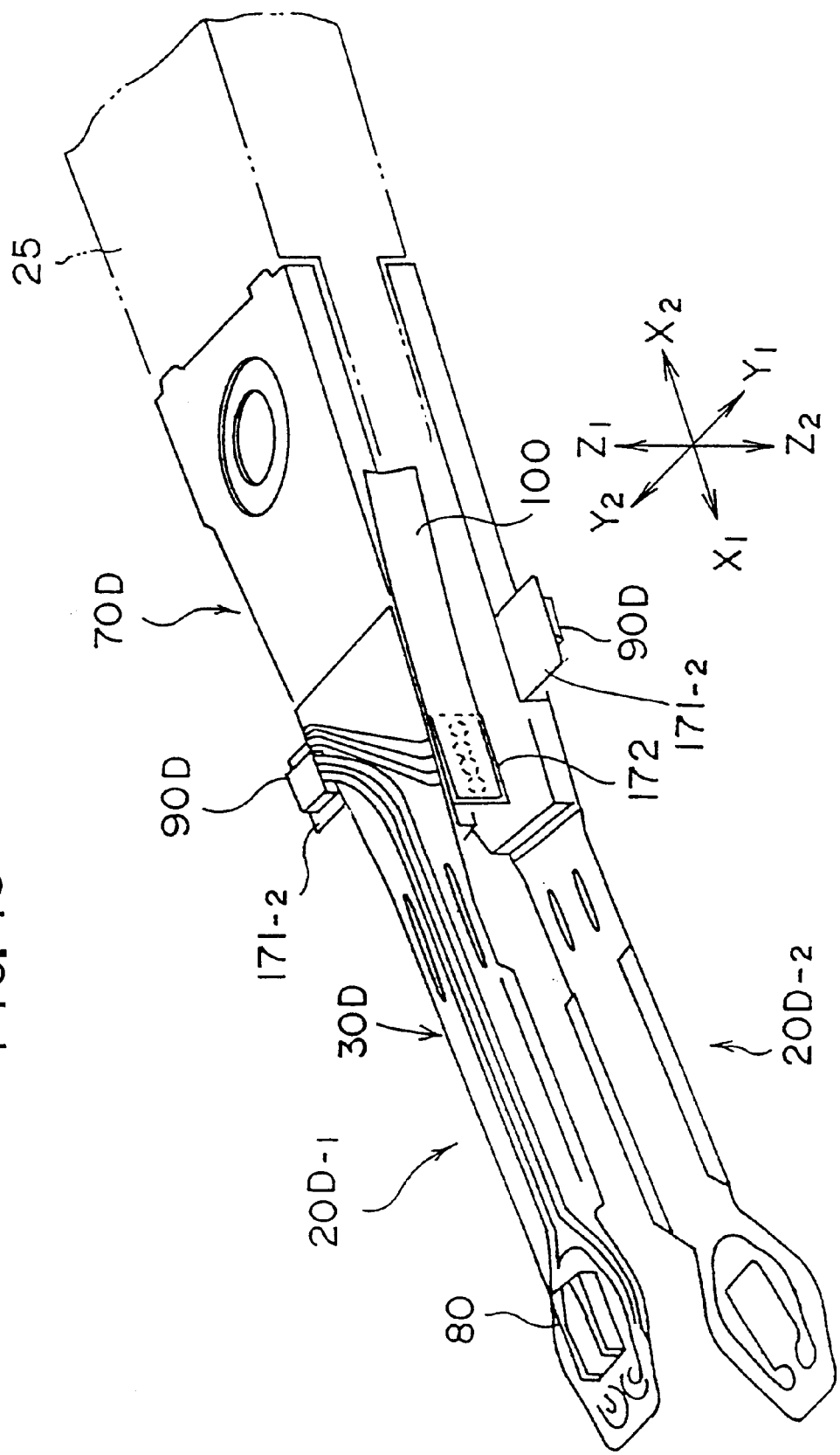
FIG. 13 is a perspective view of magnetic head slider supporting devices according to a fifth embodiment of the present invention.
Figure 14:
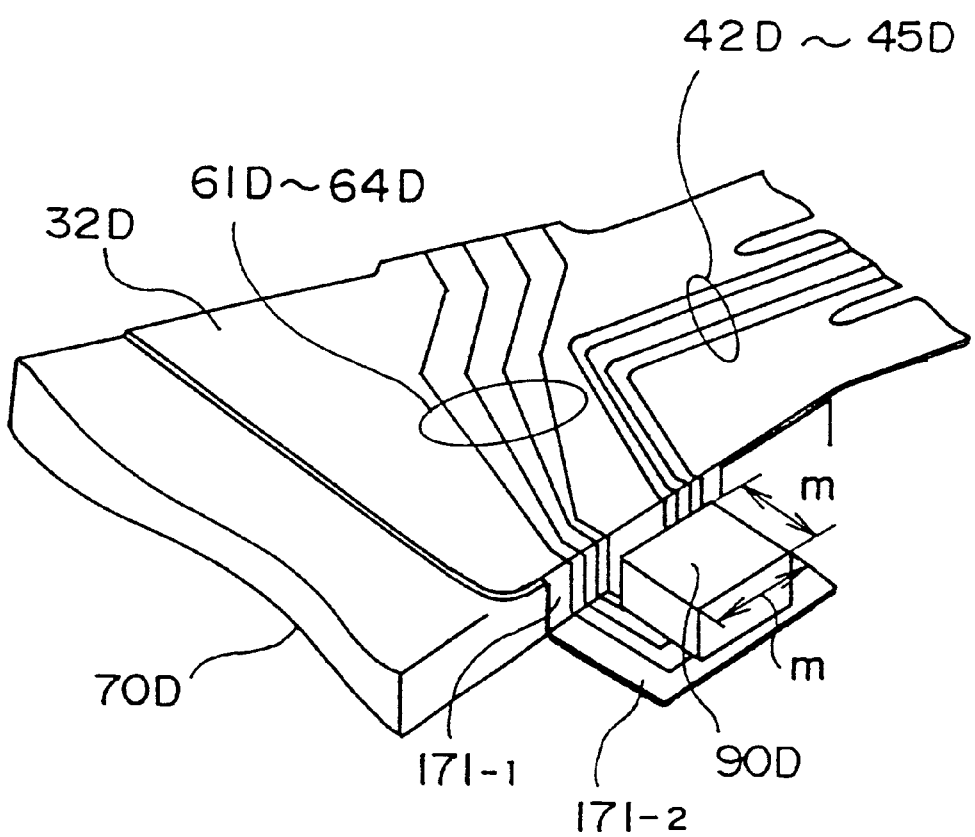
FIG. 14 is an enlarged perspective view of a part of the magnetic head slider supporting device shown in FIG. 13.

FIGS. 13 and 14 show magnetic head slider supporting devices 20D-1 and 20D-2 according to a fifth embodiment of the present invention. In FIGS. 13 and 14, parts that are the same as the parts shown in FIGS. 1 and 2 are given the same reference numerals, and parts that correspond to the parts shown in FIGS. 1 and 2 are given the same reference numerals with a suffix "D".

The magnetic head slider supporting device 20C-1 has a suspension 30D. As shown in FIGS. 13 and 14, the suspension 30D has the same structure as the suspension 30C shown in FIGS. 11 and 12 except for a first tongue portion 171 (171a) being bent in two steps. Additionally, the suspension 30D has the same structure as the suspension 30B shown in FIGS. 7 to 10 except for the first tongue portion 171 (171a) and a second tongue portion 172 (172a) being offset from each other in the longitudinal center axis 153 by a distance "i" and the first tongue portion 171 (171a) is bent in two steps.

Figure 15:
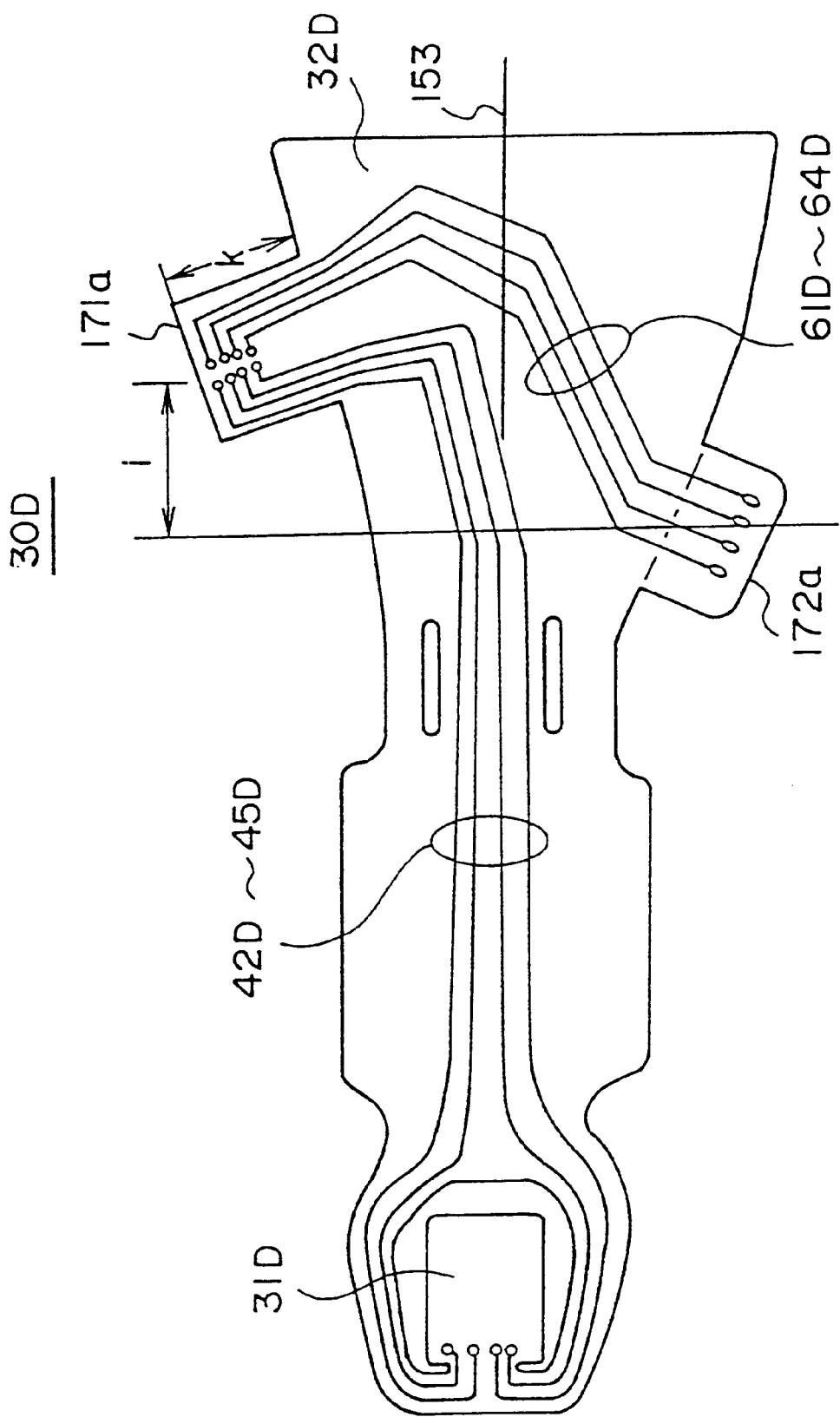
FIG. 15 is an illustration of a suspension shown in FIG. 14 which is expanded.
Figure 16:
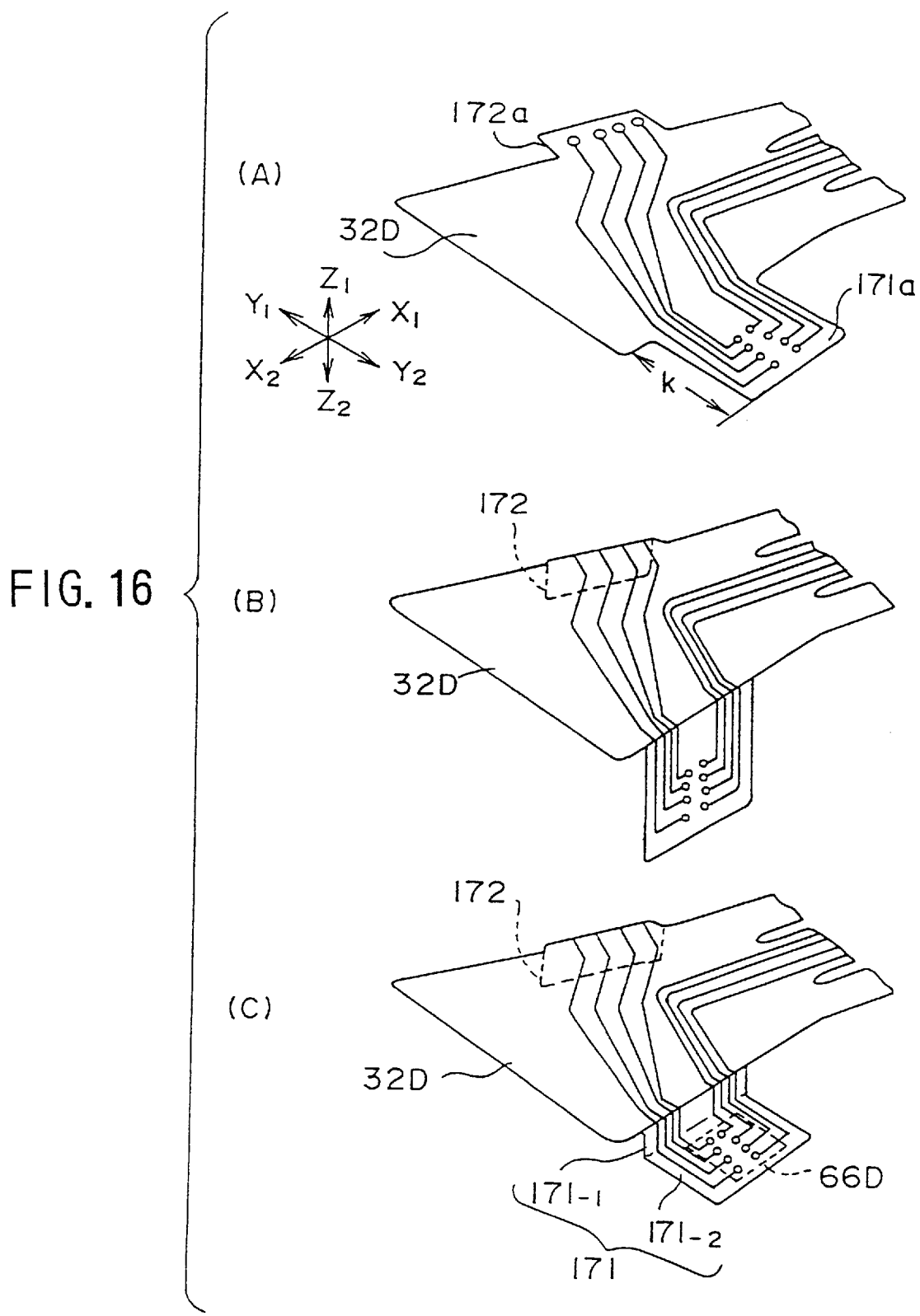
FIG. 16 is an illustration for explaining a manufacturing process of the suspension shown in FIG. 14.

As shown in FIGS. 15 and 16-(A), since the first tongue portion 171 is formed by bending in two steps, the first tongue portion 172a has a dimension "k" which is greater than the dimension "1" of the first tongue portion 161a shown in FIG. 12. The first tongue portion 172a is bent downwardly, in a first step, by 90 degrees with respect to the mount section 32D as shown in FIG. 16-(B). Then, in a second step, an end portion of the first tongue portion 172a is bent 90 degrees in a reverse direction so that the first tongue portion 171 is formed as shown in FIG. 16-(C). Thus, the first tongue portion 171 comprises a vertical wall portion 171-1 which extends a distance corresponding to a thickness of the interconnecting member 70D and a table portion 171-2 which extends parallel to the mount section 32D from a position lower than an upper surface of the mount section 32D by the thickness of the interconnecting member 70D. A bare head IC chip mounting portion 65D is formed in the table portion 171-2. The second tongue portion 172a is bent 90 degrees so that the second tongue portion 172 is formed as show in FIG. 13. The flexible printed board connecting portion 66D is formed in the second tongue portion 172. First wiring patterns 42D, 43D, 44D and 45D extend from a magnetic head slider mounting section 31D to the bare head IC chip mounting portion 65D. Second wiring patterns 61D, 62D, 63D and 64D traverse the mount section 32D and extend to the flexible printed board connecting portion 66D.

In the magnetic head slider supporting device 20D-1, as shown in FIGS. 13 and 14, the magnetic head slider 80 is mounted on an end of the suspension 30D. The mount section 32D is fixed to the interconnecting member 70D by welding. The bare head IC chip 90 is mounted on the bare head IC chip mounting portion 65D, and an end of the flexible printed board 100 is soldered to the flexible printed board connecting portion 66D.

Since the bare head IC chip 90D is mounted on the table portion 171-2 which extends in a horizontal direction, the IC chip 90 is accommodated within a predetermined thickness without being influenced by a dimension "m" of the IC chip 90 even if the dimension "m" is large.

The magnetic head slider supporting device 20D-2 has the same structure as the above-mentioned magnetic head slider supporting device 20D-1.

In the magnetic disc apparatus 21D, the interconnecting member 70D of the magnetic head slider supporting device 20D-1 is mounted to an upper side of the arm 25. Additionally, the interconnecting member 70D of the magnetic head slider supporting device 20D-2 is mounted upside down to a lower side of the arm 25. The magnetic head slider supporting devices 20D-1 and 20D-2 are interposed between the magnetic discs 23-1 and 23-2 (refer to FIG. 3B). Even if the a size of the bare head IC chip 90 is large, sufficient room is provided between the mounted bare head IC chip 90 and each of the magnetic discs 23-1 and 23-2.

It should be noted that the first tongue portion 171 and the second tongue portion 172 may be arranged in the same position with respect to the longitudinal direction of the suspension 30D.

It should also be noted that the magnetic disc apparatus 20D can write and read a signal having a frequency exceeding 70 MHz and up to 200 MHz since the above-mentioned magnetic head slider supporting devices 20D-1 and 20D-2 are incorporated therein.

Variation of the Embodiments It should be noted that, in the above-mentioned embodiments, the base side of the suspension 30 may be directly fixed to the arm 25. A head slider having an optical head can be applied to the above mentioned embodiments instead of the magnetic head slider 80.

The present invention is not limited to the specifically disclosed embodiments, and variations and modifications may be made without departing from the scope of the present invention.

What is claimed is:

1. A suspension elastically supporting a head slider having a head, comprising:

a base portion adapted to be mounted to an arm driven by an actuator;

a head slider mounting portion adapted to support the head slider, said head slider mounting portion being formed on an end of said suspension opposite to said base portion;

a portion located between said base portion and said head slider mounting portion containing a rigid portion having less flexibility than an elastically bendable portion, said elastically bendable portion being closer to the base portion than said rigid portion is to said base portion, and said rigid portion having a rib formed along each side thereof by bending said each side of said rigid portion substantially perpendicularly to a surface of said rigid portion;

a wiring pattern extending from said head slider mounting portion to said base portion; and a head IC chip mounting portion formed on a surface of said rigid portion, said head IC chip mounting portion being adapted to support a head IC chip connected to the head.

2. The suspension as claimed in claim 1, wherein said wiring pattern is provided on said surface of said rigid portion.

3. The suspension as claimed in claim 1, wherein said head slider mounting portion is provided on a surface of said suspension opposite said surface on which said head IC chip mounting portion is formed.

4. A head slider supporting device comprising:

A) a suspension comprising;
   a base portion adapted to be mounted to an arm driven by an actuator,
   a head slider mounting portion formed on an end of said suspension opposite to said base portion,
   a rigid portion located between said base portion and said head slider mounting portion, said rigid portion having a rib formed along each side thereof by bending said each side of said rigid portion substantially perpendicularly to a surface of said rigid portion,
   a wiring pattern extending from said head slider mounting portion to said base portion, and
   a head IC chip mounting portion formed on a surface of said rigid portion, B) a head slider mounted on said head slider mounting potion of said suspension, said head slider including a head; and C) a head IC mounted on said head IC chip mounting portion of said rigid portion of said suspension so that said head IC is electrically connected to said head of said head slider.

5. The supporting device as claimed in claim 4, wherein said wiring pattern is provided on said surface of said rigid portion.

6. The supporting device as claimed in claim 4, wherein said head slider mounting portion is provided on a surface of said suspension opposite said surface on which said head IC chip mounting portion is formed.

7. A disc apparatus comprising:

A) a rotating disk;

B) an actuator;

C) an arm driven by said actuator; and

D) a head slider supporting device including,
   D-1) a suspension having,
      a base portion mounted to said arm,
      a head slider mounting portion formed on an end of said suspension opposite to said base portion,
      a rigid portion located between said base portion and said head slider mounting portion, said rigid portion having a rib formed along each side thereof by bending said each side of said rigid portion substantially perpendicularly to a surface of said rigid portion,
      a wiring pattern extending from said head slider mounting portion to said base portion, and
      a head IC chip mounting portion formed on said surface of said rigid portion,
   D-2) a head slider mounted on said head slider mounting portion of said suspension, said head slider including a head, and
   D-3) a head IC mounted on said head IC chip mounting portion of said rigid portion of said suspension so that said head IC is electrically connected to said head of said head slider.

8. The disc apparatus as claimed in claim 7, wherein said wiring pattern is provided on said surface of said rigid portion.

9. The disc apparatus as claimed in claim 7, wherein said head slider mounting portion is provided on a surface of said suspension opposite said surface on which said head IC chip mounting portion is formed.

* * * * *

UNITED STATES PATENT AND TRADEMARK OFFICE
CERTIFICATE OF CORRECTION

PATENT NO. : 6,388,840 B1
DATED : May 14, 2002
INVENTOR(S) : Takeshi Ohwe

It is certified that error appears in the above-identified patent and that said Letters Patent is hereby corrected as shown below:

<u>Title page,</u>
Item [56], References Cited, U.S. PATENT DOCUMENTS, for U.S. Patent No. 5,608,591 delete "Klassen" and insert -- Klaassen -- therefor <u>Column 19,</u>
Line 34, delete "potion" and insert -- portion -- therefor Signed and Sealed this Eighteenth Day of February, 2003

JAMES E. ROGAN
*Director of the United States Patent and Trademark Office*